US012380842B2

(12) United States Patent
Bae et al.

(10) Patent No.: US 12,380,842 B2
(45) Date of Patent: Aug. 5, 2025

(54) DISPLAY DEVICE AND DRIVING METHOD THEREOF

(71) Applicant: LG Display Co., Ltd., Seoul (KR)

(72) Inventors: Jaeyoon Bae, Seoul (KR); Sangho Yu, Seoul (KR); Jaeik Yoo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 79 days.

(21) Appl. No.: 18/520,044

(22) Filed: Nov. 27, 2023

(65) Prior Publication Data

US 2024/0221633 A1 Jul. 4, 2024

(30) Foreign Application Priority Data

Dec. 28, 2022 (KR) ........................ 10-2022-0186574

(51) Int. Cl.
*G09G 3/3208* (2016.01)

(52) U.S. Cl.
CPC ... *G09G 3/3208* (2013.01); *G09G 2300/0852* (2013.01); *G09G 2310/0213* (2013.01); *G09G 2310/0251* (2013.01); *G09G 2310/08* (2013.01); *G09G 2330/10* (2013.01)

(58) Field of Classification Search
CPC ... G09G 2300/0852; G09G 2310/0213; G09G 2310/0251; G09G 2310/08; G09G 2330/10; G09G 3/3208; G09G 3/3233
See application file for complete search history.

(56) References Cited

U.S. PATENT DOCUMENTS

2021/0104185 A1* 4/2021 Park ....................... G09G 3/006

* cited by examiner

*Primary Examiner* — Robin J Mishler
(74) *Attorney, Agent, or Firm* — Fenwick & West LLP

(57) ABSTRACT

A display device and a driving method thereof are disclosed. In a defective subpixel detection time for detecting a defective subpixel, a gate driving circuit may supply turn-on signals to a first-first gate line group included in a plurality of gate lines and supply turn-off signals to a first-second gate line group other than the first-first gate line group among the plurality of gate lines, thereby quickly detecting a defective subpixel.

20 Claims, 13 Drawing Sheets

DISPLAY DEVICE AND DRIVING METHOD THEREOF

CROSS-REFERENCE TO RELATED APPLICATION

This application claims the benefit of Republic of Korea Patent Application No. 10-2022-0186574, filed on Dec. 28, 2022, which is hereby incorporated by reference in its entirety.

BACKGROUND

Technical Field

Embodiments of the present disclosure relate to a display device and a driving method thereof.

Description of Related Art

As the information society develops, demands for display devices for displaying an image are increasing in various forms. Recently, various display devices such as a liquid crystal display device, electroluminescent display device, an organic light emitting diode display device, quantum-dot light emitting display device, field emission display device, plasma display device, electrophoretic display device have been used.

In order to display an image, a display device may include a display panel in which a plurality of data lines, a plurality of gate lines and a plurality of subpixels are disposed, a data driving circuit which outputs data signals to the plurality of data lines, and a gate driving circuit which outputs scan signals to the plurality of gate lines.

When defects occur, during image driving, in some of elements included in the plurality of subpixels, an image may not be properly realized. That is to say, during image driving, a defective subpixel may occur among the plurality of subpixels.

Although the defective subpixel may be detected through a sensing method performed between image driving times, it takes a long time.

In the case of a commercial display device, a defective subpixel cannot be detected by a sensing method that takes a long time, during a long time driving due to the nature of the purpose of use.

SUMMARY

The inventors have recognized the limitation described above.

Accordingly, various embodiments of the present disclosure are directed to providing a display device and a driving method thereof, capable of quickly detecting a defective subpixel.

Embodiments of the present disclosure may provide a display device including: a display panel including a plurality of subpixels which are electrically connected to a plurality of data lines, a plurality of reference voltage lines and a plurality of gate lines; a data driving circuit configured to supply voltages to the plurality of data lines and sense voltages of the plurality of reference voltage lines; and a gate driving circuit configured to supply gate signals to the plurality of gate lines, wherein a defective subpixel detection time for detecting a defective subpixel among the plurality of subpixels includes a first middle scan signal supply time in which the gate driving circuit supplies turn-on signals to a first-first gate line group included in the plurality of gate lines and supplies turn-off signals to a first-second gate line group other than the first-first gate line group among the plurality of gate lines.

Embodiments of the present disclosure may provide a method for driving a display device, including: a first detection as an initial detection for detecting a defective subpixel among a plurality of subpixels performed in a first detection time; a plurality of middle detections that proceed after the first detection performed in a plurality of middle detection times; and a last detection that proceeds after the plurality of middle detections and in which the defective subpixel is detected performed in a last detection time, wherein the plurality of middle detection times include a first middle scan signal supply time in which a gate driving circuit supplies turn-on signals to a first-first gate line group included in a plurality of gate lines and supplies turn-off signals to a first-second gate line group other than the first-first gate line group among the plurality of gate lines.

According to the embodiments of the present disclosure, it is possible to provide a display device capable of quickly detecting a defective subpixel.

According to the embodiments of the present disclosure, it is possible to provide a method for driving a display device, capable of quickly detecting a defective subpixel.

Technical benefits of the present disclosure are not limited to the above-mentioned benefits.

It is to be understood that both the foregoing general description and the following detailed description are exemplary and explanatory and are intended to provide further explanation of the inventive concepts as claimed.

BRIEF DESCRIPTION OF DRAWINGS

The above and other objects, features, and advantages of the present disclosure will be more clearly understood from the following detailed description, taken in conjunction with the accompanying drawings.

The accompanying drawings, which are included to provide a further understanding of the disclosure and are incorporated in and constitute a part of this application, illustrate embodiments of the disclosure, and together with the description serve to explain the principle of the disclosure. In the drawings.

Figure 1:
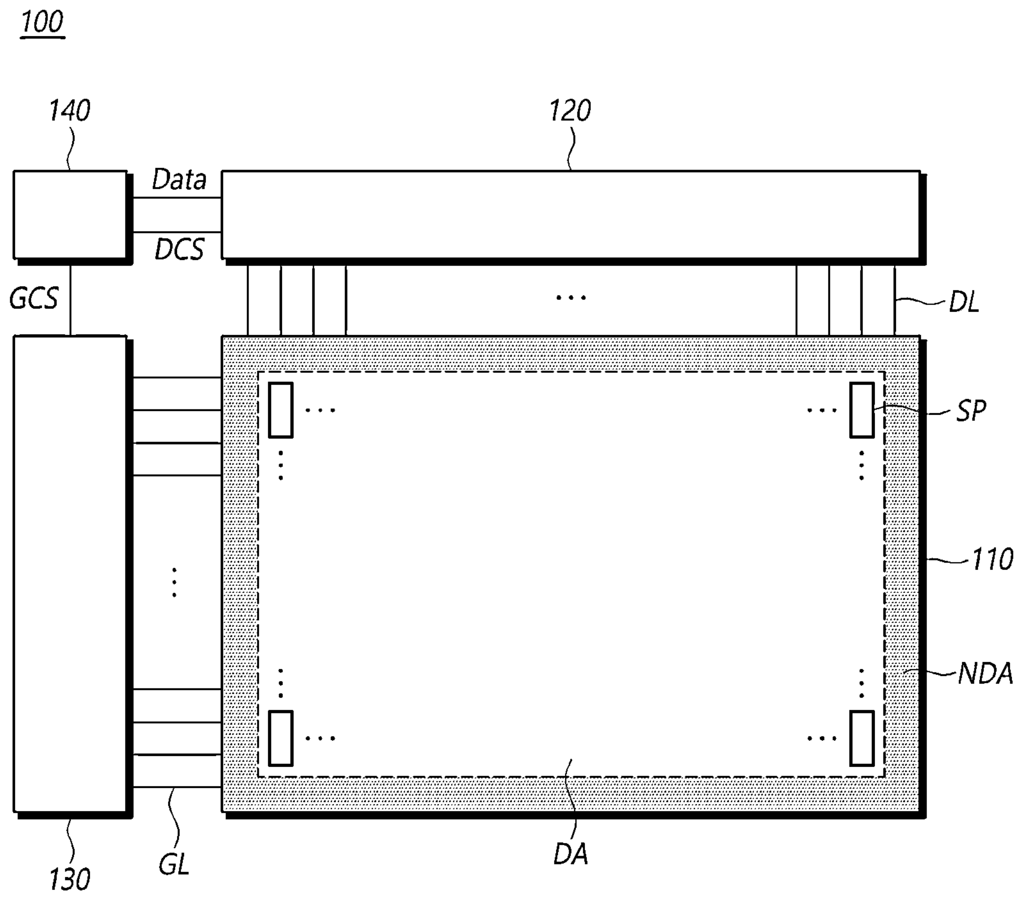
FIG. 1 is a configuration diagram of a display device in accordance with exemplary embodiments of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted or may be briefly discussed when it is determined that the descriptions may unnecessarily make the subject matter in some embodiments of the present disclosure rather unclear. The progression of processing steps and/or operations described is an example; however, the sequence of steps and/or operations is not limited to that set forth herein and may be changed as is known in the art, with the exception of steps and/or operations necessarily occurring in a particular order. The terms such as "include", "have", "contain", "comprise", "constitute", "make up of", and "formed of" used herein are generally intended to allow other components to be added unless the terms are used with a more limiting term such as "only" or "merely", etc. As used herein, singular forms are intended to include plural forms unless the context clearly indicates otherwise.

Terms, such as "first", "second", "A", "B", "(A)", or "(B)", "a", "b", "1", "2" may be used herein to describe elements of the present disclosure. Each of these terms is not used to define basis, order, sequence, or number of elements etc., but is used merely to distinguish the corresponding element from other elements.

When it is mentioned that a first element "is connected or coupled or adhered or joined to", "contacts or overlaps" etc. a second element, it should be interpreted that, not only can the first element "be directly connected or adhered or joined to" or "directly contact or overlap" the second element, but a third element can also be "disposed" or "interposed" between the first and second elements, or the first and second elements can "be connected or adhered or joined to", "contact or overlap", etc. each other via a fourth element. Here, the second element may be included in at least one of two or more elements that "are connected or adhered or joined to", "contact or overlap", etc. each other.

When time relative terms, such as "after", "subsequent to", "following", "next", "before," and the like, are used to describe processes or operations of elements or configurations, or flows or steps in operating, processing, manufacturing methods, these terms may be used to describe non-consecutive or non-sequential processes or operations unless a more limiting term such as "directly" or "immediately" or "just", etc. is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure may be sufficiently thorough and complete to assist those skilled in the art to fully understand the scope of the present disclosure. Further, the protected scope of the present disclosure is defined by claims and their equivalents.

FIG. 1 is a system configuration diagram of a display device 100 in accordance with exemplary embodiments of the present disclosure. All the components of each display device according to all embodiments of the present disclosure are operatively coupled and configured.

Referring to FIG. 1, the display device 100 in accordance with the embodiments of the present disclosure may include a display panel 110 and a driving circuit for driving the display panel 110.

The display panel 110 may include signal lines such as a plurality of data lines DL and a plurality of gate lines GL, and may include a plurality of subpixels SP disposed in an area defined by the data lines and the gate lines. The plurality of data lines may be arranged in rows or columns, and the plurality of gate lines may be arranged in columns or rows. The display panel 110 may include a display area DA where an image is displayed and a non-display area NDA, in the vicinity of the display area DA or entirely or partly surrounding the display area DA, where an image is not displayed. In the display panel 110, the plurality of subpixels SP for displaying an image may be disposed in the display area DA. In the non-display area NDA, driving circuits may be electrically connected or mounted, and pad parts to which integrated circuits or printed circuits, or the like, are connected may be disposed.

The driving circuit may include a data driving circuit 120 and a gate driving circuit 130, and may further include a controller 140 which may be electrically connected or disposed in the non-display area NDA and controls the data driving circuit 120 and the gate driving circuit 130.

The data driving circuit 120 as a circuit for driving the plurality of data lines DL may supply data signals to the plurality of data lines DL. The gate driving circuit 130 as a circuit for driving the plurality of gate lines GL may sequentially supply gate signals to the plurality of gate lines GL arranged on the display panel 110, thereby controlling the driving timing of the plurality of subpixels SP. The data driving circuit 120 may output a data voltage to each data line DL according to the timing at which a scan signal is applied through the gate line GL and may control each subpixel to represent a brightness according to the image data.

The gate driving circuit 130 may output a gate signal of a turn-on level voltage or a gate signal of a turn-off level voltage under the control of the controller 140. By sequentially supplying a gate signal of a turn-on level voltage to the plurality of gate lines GL, the gate driving circuit 130 may sequentially drive the plurality of gate lines GL, thereby controlling the driving timing of the plurality of subpixels SP.

To control the operation timing of the data driving circuit 120, the controller 140 may supply a data control signal DCS to the data driving circuit 120. The controller 140 may supply a gate control signal GCS for controlling the operation timing of the gate driving circuit 130 to the gate driving circuit 130.

To be more specific, in order to control the data driving circuit 120, the controller 140 may receive one or more of timing signals such as a vertical synchronous signal VSYNC, a horizontal synchronous signal HSYNC, an input data enable signal DE, a clock signal CLK, and the like from other devices, networks, or host systems, and output various data control signals DCS including, e.g., a source start pulse SSP, a source sampling clock SSC, and a source output enable signal SOE, and the like.

The source start pulse SSP can control the data sampling start timing of one or more source driver integrated circuits SDICs constituting the data driving circuit 120. The source sampling clock SSC can be a clock signal for controlling the sampling timing of data in each source driver integrated circuit (SDIC). The source output enable signal SOE can control the output timing of the data driving circuit 120.

In addition, to control the gate driving circuit 130, the controller 140 may receive one or more of timing signals such as a vertical synchronous signal VSYNC, a horizontal synchronous signal HSYNC, an input data enable signal DE, a clock signal CLK, and the like from other devices, networks, or host systems, and output various gate control signals GCS including a gate start pulse GSP, a gate shift clock GSC, and a gate output enable signal GOE.

The gate start pulse GSP can control the operation start timing of one or more gate driver integrated circuits GDICs constituting the gate driving circuit 130. The gate shift clock GSC can be a clock signal commonly input to one or more gate driver integrated circuits GDICs and can control the shift timing of the scan signals. The gate output enable signal GOE can designate timing information about one or more gate driver integrated circuits GDICs.

The controller 140 may control the gate driving circuit 130 to output a scan signal according to a timing implemented in each frame, may convert input image data inputted from the outside (e.g., other devices or other image providing sources such as host systems) to be suitable for a data signal format used in the data driving circuit 120 and supply converted image data Data to the data driving circuit 120, and may control a driving of data at a proper time corresponding to the scan.

In order to control the data driving circuit 120 and the gate driving circuit 130, the controller 140 may receive, from the outside (e.g., a host system), various timing signals including a vertical synchronization signal Vsync, a horizontal synchronization signal Hsync, an input data enable signal DE and a clock signal CLK, along with the image data, may generate various control signals such as DCS and GCS using various timing signals received from the outside, and output the various control signals such as DCS and GCS to the data driving circuit 120 and the gate driving circuit 130.

The controller 140 may be implemented as a component separate from the data driving circuit 120, or may be implemented as an integrated circuit by being integrated with the data driving circuit 120.

The data driving circuit 120 receives the image data Data from the controller 140, converts the image data Data into an analog data voltage Vdata, and supplies the analog data voltage Vdata to the plurality of data lines DL according to the timing at which the scan signal is applied through the gate line GL, thereby driving the plurality of data lines DL. The data driving circuit 120 is also referred to as a source driving circuit. Such a data driving circuit 120 may include at least one source driver integrated circuit (SDIC). Each source driver integrated circuit (SDIC) may include a shift register, a level shifter, a latch circuit, a digital-to-analog converter (DAC), an output buffer, and so forth. As the case may be, each source driver integrated circuit (SDIC) may further include an analog-to-digital converter (ADC).

For example, each source driver integrated circuit (SDIC) may be connected to the display panel 110 in a tape automated bonding (TAB) method, may be connected to bonding pads of the display panel 110 in a chip-on-glass (COG) or chip-on-panel (COP) method, or may be connected to the display panel 110 by being implemented in a chip-on-film (COF) method. In this case, each source driver integrated circuit SDIC can be mounted on a film connected to the display panel 110, and can be electrically connected to the display panel 110 through wires on the film. Alternatively, each source driver integrated circuit SDIC can be directly disposed on the display panel 110. Alternatively, the source driver integrated circuit SDIC can be integrated and arranged on the display panel 110.

The gate driving circuit 130 may be connected to the display panel 110 in the tape automated bonding (TAB) method, may be connected to bonding pads of the display panel 110 in the chip-on-glass (COG) or chip-on-panel (COP) method, or may be connected to the display panel 110 according to the chip-on-film (COF) method. Alternatively, the gate driving circuit 130 may be formed in the non-display area NDA of the display panel 110 in a gate-in-panel (GIP) type. Alternatively, the gate driving circuit 130 can be integrated and arranged on the display panel 110. For example, the gate driving circuit 130 may be disposed on or over the substrate SUB or may be connected to the substrate SUB. In other words, the gate driving circuit 130 that is of a GIP type may be disposed in the non-display area NDA of the substrate SUB. The gate driving circuit 130 that is of a chip-on-glass (COG) type or chip-on-film (COF) type, or the like, may be connected to the substrate SUB.

When a specific gate line GL is selectively driven by the gate driving circuit 130, the data driving circuit 120 may convert the image data Data received from the controller 140 into the data voltage of an analog form, and may supply the data voltage resulting from the converting to the plurality of data lines DL.

The data driving circuit 120 may be connected to, but not limited to, one side (e.g., the top side or the bottom side) of the display panel 110. In some embodiments, depending on a driving method, a panel design method, etc., the data driving circuit 120 may be connected to, but not limited to, both sides (e.g., the top side and the bottom side) of the display panel 110, or may be connected to at least two sides of the four sides (e.g., the upper portion, the lower portion, a left side, and a right side) of the display panel 110.

The gate driving circuit 130 may be connected to, but not limited to, one side (e.g., the left side or the right side) of the display panel 110. Depending on a driving method, a panel design method, etc., the gate driving circuit 130 may be connected to, but not limited to, both sides (e.g., the left side and the right side) of the display panel 110, or may be connected to at least two sides of the four sides (e.g., an upper portion, a lower portion, the left side, and the right side) of the display panel 110.

The controller 140 may be a timing controller which is used in a typical display technology, may be a control device which includes a timing controller and further performs other control functions as well as the typical functions of the timing controller, may be a control device which is different from a timing controller, or may be a circuit in a control device. In some embodiments, the controller 140 may be one or more other control circuits different from the timing controller or implemented by various circuits or electronic parts such as an integrated circuit (IC), a field programmable gate array (FPGA), an application specific integrated circuit (ASIC), a processor, and/or the like.

The controller 140 may be mounted on a printed circuit board, a flexible printed circuit, or the like, and may be electrically connected to the data driving circuit 120 and the gate driving circuit 130 through the printed circuit board, the flexible printed circuit or the like. The controller 140 may transmit and receive signals to and from the data driving circuit 120 according to at least one predetermined interface. For example, the interface may include a low voltage differential signaling (LVDS) interface, a reduced swing differential signaling (RSDS) interface, a Time Minimized Differential Signaling (TMDS) interface, an Embedded Clock Point-Point Interface (EPI) interface, a Serial Peripheral Interface (SPI), etc. The controller 140 may include a storage such as at least one register.

The display device 100 in accordance with the embodiments of the present disclosure may be a self-luminous display such as an organic light emitting diode (OLED) display, a quantum dot display or a micro light emitting diode (micro-LED) display, but embodiments of the present disclosure are not limited to, a plasma display panel device PDP, and an electroluminescence display device ELD and the like may be applicable as well.

If the display device 100 according to exemplary embodiments of the disclosure is an OLED display, each subpixel SP may include an organic light emitting diode (OLED), which by itself emits light, as the light emitting element. If the display device 100 according to embodiments of the disclosure is a quantum dot display, each subpixel SP may include a light emitting element formed of a quantum dot, which is a self-luminous semiconductor crystal. If the display device 100 according to embodiments of the disclosure is a micro-LED display, each subpixel SP may include a micro-LED, which is self-emissive and formed of an inorganic material, as the light emitting element.

Figure 2:
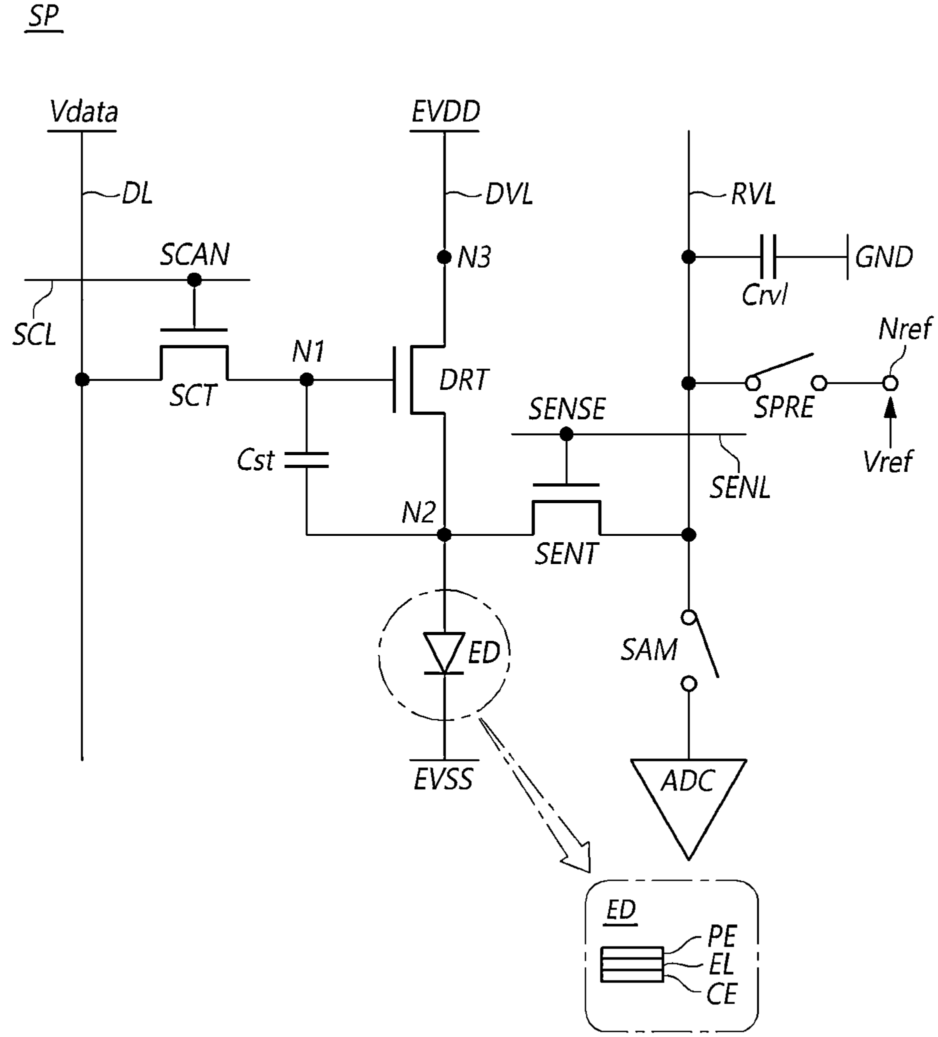
FIG. 2 is an equivalent circuit diagram of a subpixel of a display device in accordance with exemplary embodiments of the present disclosure.

FIG. 2 is an equivalent circuit diagram of a subpixel SP of a display device 100 in accordance with exemplary embodiments of the present disclosure.

Referring to FIG. 2, each of the plurality of subpixels SP disposed in the display panel 110 of the display device 100 in accordance with the embodiments of the present disclosure may include a light emitting element ED, a driving transistor DRT, a scan transistor SCT, a sensing transistor SENT, and a storage capacitor Cst. As such, when the subpixel SP includes three transistors DRT, SCT and SENT and one capacitor Cst, the subpixel SP is referred to as having a 3T (transistor) 1C (capacitor) structure.

An example illustrated in FIG. 2 represents a 3T1C structure which includes three transistors and one capacitor, but embodiments of the present disclosure are not limited to this. For example, 4T1C, 5T1C, 3T2C, 4T2C, 5T2C, 6T2C, 7T1C, 7T2C, and 8T2C structures etc. are also possible. Accordingly, a varying number of transistors and capacitors could be included.

The light emitting element ED may include a pixel electrode PE, a common electrode CE, and a light emitting layer EL which is positioned between the pixel electrode PE and the common electrode CE. The pixel electrode PE of the light emitting element ED may be disposed in each subpixel SP, and the common electrode CE may be disposed in common in all or some of a plurality of subpixels SP. For example, the pixel electrode PE may be an anode electrode, and the common electrode CE may be a cathode electrode. For another example, the pixel electrode PE may be a cathode electrode, and the common electrode CE may be an anode electrode. For example, the light emitting element ED may be an organic light emitting diode (OLED), a micro light emitting diode (micro-LED) or a quantum dot light emitting element.

The driving transistor DRT as a transistor for driving the light emitting element ED may have a first node N1, a second node N2 and a third node N3.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT, may be electrically connected to a source node or a drain node of the sensing transistor SENT, and may also be electrically connected to the pixel electrode PE of the light emitting element ED. The third node N3 of the driving transistor DRT may be electrically connected to a driving voltage line DVL which supplies a driving voltage EVDD. If driving transistor DRT is an n-type transistor, the gate electrode turn-on level voltage thereof may be a high-level voltage. If the driving transistor DRT is a p-type transistor, gate electrode turn-on level voltage thereof may be a low-level voltage.

The scan transistor SCT may be controlled by a scan signal SCAN, and may be connected between the first node N1 (e.g., gate electrode) of the driving transistor DRT and the data line DL. The scan transistor SCT may be turned on or off according to the scan signal SCAN supplied from a scan signal line SCL which is one kind of gate line GL, thereby controlling electrical connection between the data line DL and the first nodes N1 of the driving transistor DRT.

The scan transistor SCT may be turned on by the scan signal SCAN having a turn-on level voltage, and thereby, may transfer a data voltage Vdata supplied from the data line DL to the first node N1 of the driving transistor DRT.

The turn-on level voltage of the scan signal SCAN capable of turning on the scan transistor SCT may be a high-level voltage or a low-level voltage. A turn-off level voltage of the scan signal SCAN capable of turning off the scan transistor SCT may be a low-level voltage or a high-level voltage. For example, when the scan transistor SCT is an n-type transistor, the turn-on level voltage may be a high-level voltage and the turn-off level voltage may be a low-level voltage. For another example, when the scan transistor SCT is a p-type transistor, the turn-on level voltage may be a low-level voltage and the turn-off level voltage may be a high-level voltage.

The sensing transistor SENT may be controlled by a sense signal SENSE, and may be connected between the second node N2 of the driving transistor DRT and a reference voltage line RVL. The sensing transistor SENT may be turned on or off according to the sense signal SENSE supplied from a sense signal line SENL which is another kind of gate line GL, thereby controlling electrical connection between the reference voltage line RVL and the second node N2 of the driving transistor DRT.

The sensing transistor SENT may be turned on by the sense signal SENSE having a turn-on level voltage, and thereby, may transfer a reference voltage Vref supplied from the reference voltage line RVL to the second node N2 of the driving transistor DRT.

The turn-on level voltage of the sense signal SENSE capable of turning on the sensing transistor SENT may be a high-level voltage or a low-level voltage. The turn-off level voltage of the sense signal SENSE capable of turning off the sensing transistor SENT may be a low-level voltage or a high-level voltage. For example, when the sensing transistor SENT is an n-type transistor, the turn-on level voltage may be a high-level voltage and the turn-off level voltage may be a low-level voltage. For another example, when the sensing transistor SENT is a p-type transistor, the turn-on level voltage may be a low-level voltage and the turn-off level voltage may be a high-level voltage.

The display device 100 may further include a line capacitor Crvl which is formed between the reference voltage line RVL and a ground GND, a sampling switch SAM which controls electrical connection between the reference voltage line RVL and the analog-to-digital converter ADC, and a power switch SPRE which controls electrical connection between the reference voltage line RVL and a reference voltage supply node Nref. The reference voltage Vref outputted from a power supply device may be supplied to the reference voltage supply node Nref, and may be applied to the reference voltage line RVL through the power switch SPRE.

The sensing transistor SENT may be turned on by the sense signal SENSE having a turn-on level voltage, and thereby, may transfer a voltage V2 of the second node N2 of the driving transistor DRT to the reference voltage line RVL. Accordingly, the line capacitor Crvl which is formed between the reference voltage line RVL and the ground GND may be charged.

The function of the sensing transistor SENT to transfer the voltage V2 of the second node N2 of the driving transistor DRT to the reference voltage line RVL may be used during a driving to sense the characteristic value of the subpixel SP. In this case, a voltage transferred to the reference voltage line RVL may be a voltage for calculating the characteristic value of the subpixel SP or a voltage on which the characteristic value of the subpixel SP is reflected.

In the present disclosure, the characteristic value of the subpixel SP may be the characteristic value of the driving transistor DRT or the light emitting element ED. The characteristic value of the driving transistor DRT may for example include the threshold voltage and/or mobility of the driving transistor DRT. The characteristic value of the light emitting element ED may include the threshold voltage of the light emitting element ED.

Each of the driving transistor DRT, the scan transistor SCT and the sensing transistor SENT may be an n-type transistor or a p-type transistor, or combinations thereof. In the present disclosure, for the sake of convenience in explanation, it is exemplified that each of the driving transistor DRT, the scan transistor SCT and the sensing transistor SENT is an n-type.

The storage capacitor Cst may be connected between the first node N1 and the second node N2 of the driving transistor DRT. The storage capacitor Cst is charged with an amount of charge corresponding to a voltage difference between both ends, and serves to maintain the voltage difference between both ends for a predetermined frame time. Accordingly, during the predetermined frame time, the corresponding subpixel SP may emit light.

The storage capacitor Cst may not be a parasitic capacitor (e.g., Cgs or Cgd) which is an internal capacitor existing between the gate node and the source node (or the drain node) of the driving transistor DRT, but may be an external capacitor which is intentionally designed outside the driving transistor DRT.

The scan signal line SCL and the sense signal line SENL may be different gate lines GL. In this case, the scan signal SCAN and the sense signal SENSE may be separate gate signals from each other, and an on-off timing of the scan transistor SCT and an on-off timing of the sensing transistor SENT in one subpixel SP may be independent of each other. In other words, the on-off timing of the scan transistor SCT and the on-off timing of the sensing transistor SENT in one subpixel SP may be the same or different from each other.

Unlike this, the scan signal line SCL and the sense signal line SENL may be the same gate line GL. Namely, a gate node of the scan transistor SCT and a gate node of the sensing transistor SENT in one subpixel SP may be connected to one gate line GL. In this case, the scan signal SCAN and the sense signal SENSE may be the same gate signal, and an on-off timing of the scan transistor SCT and an on-off timing of the sensing transistor SENT in one subpixel SP may be the same as each other.

The reference voltage line RVL may be disposed for each one column of subpixels SP. Unlike this, the reference voltage line RVL may be disposed for each two columns of subpixels SP. When the reference voltage line RVL is disposed for each two columns of subpixels SP, a plurality of subpixels SP may be supplied with the reference voltage Vref from one reference voltage line RVL.

Figure 3:
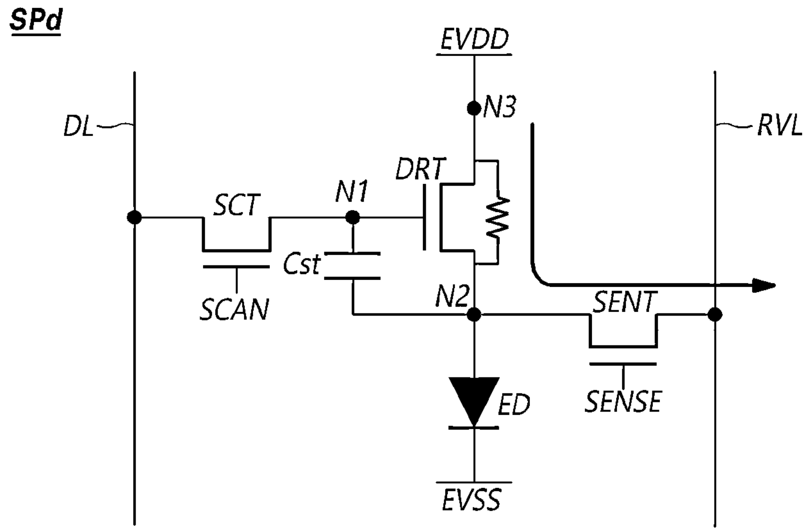
FIGS. 3 and 4 are diagrams of defective subpixels in accordance with exemplary embodiments of the present disclosure.
Figure 4:
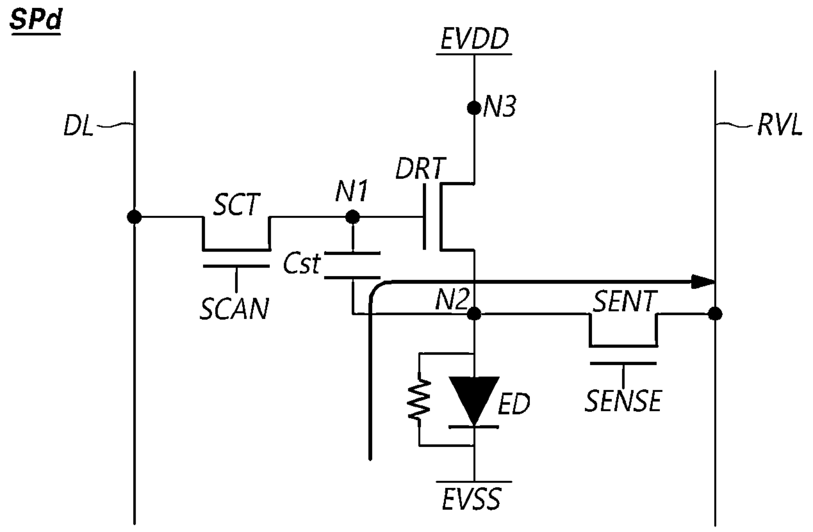

FIGS. 3 and 4 are exemplary diagrams of defective subpixels in accordance with exemplary embodiments of the present disclosure.

Referring to FIGS. 3 and 4, a subpixel SP may include a light emitting element ED, a driving transistor DRT, a scan transistor SCT, a sensing transistor SENT and a storage capacitor Cst. The structure of the subpixel SP illustrated in FIGS. 3 and 4 may be the same as the structure of the subpixel SP illustrated in FIG. 2.

Referring to FIG. 3, the subpixel SP may become a defective subpixel SPd when a defect occurs in a certain element during driving. As a second node N2 and a third node N3 are shorted, the subpixel SP may become a defective subpixel SPd. In this case, the driving transistor DRT may not be normally controlled, and a driving voltage EVDD may be supplied to the second node N2 or a reference voltage line RVL.

Referring to FIG. 4, the subpixel SP may become a defective subpixel SPd when a defect occurs in a certain element during driving. As a second node N2 and a supply node of a base voltage EVSS are shorted, the subpixel SP may become a defective subpixel SPd. In this case, the light emitting element ED may not be normally controlled, and the base voltage EVSS may be supplied to the second node N2 or a reference voltage line RVL.

The defective pixels illustrated in FIGS. 3 and 4 are merely examples, and there may also be defective subpixel (s) caused by other defects occurring in other element(s).

In this consideration, embodiments of the present disclosure may provide a display device 100 and a driving method thereof, capable of quickly detecting a defective subpixel. This will be described below in detail.

Figure 5:
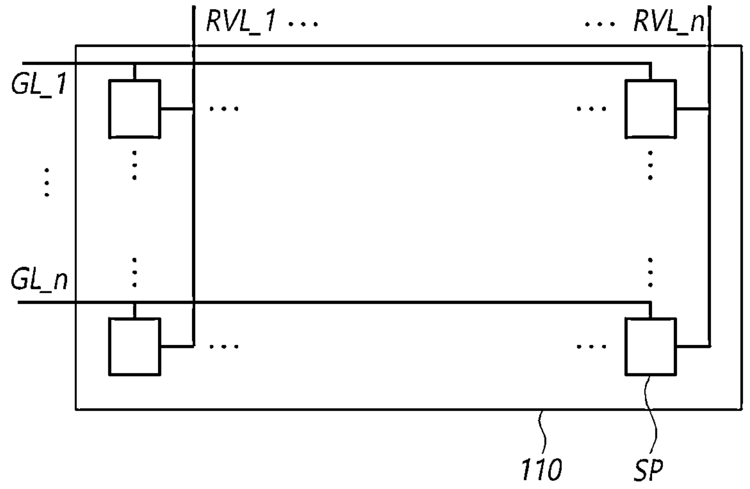
FIG. 5 is a diagram illustrating a display panel of a display device in accordance with exemplary embodiments of the present disclosure.
Figure 6:
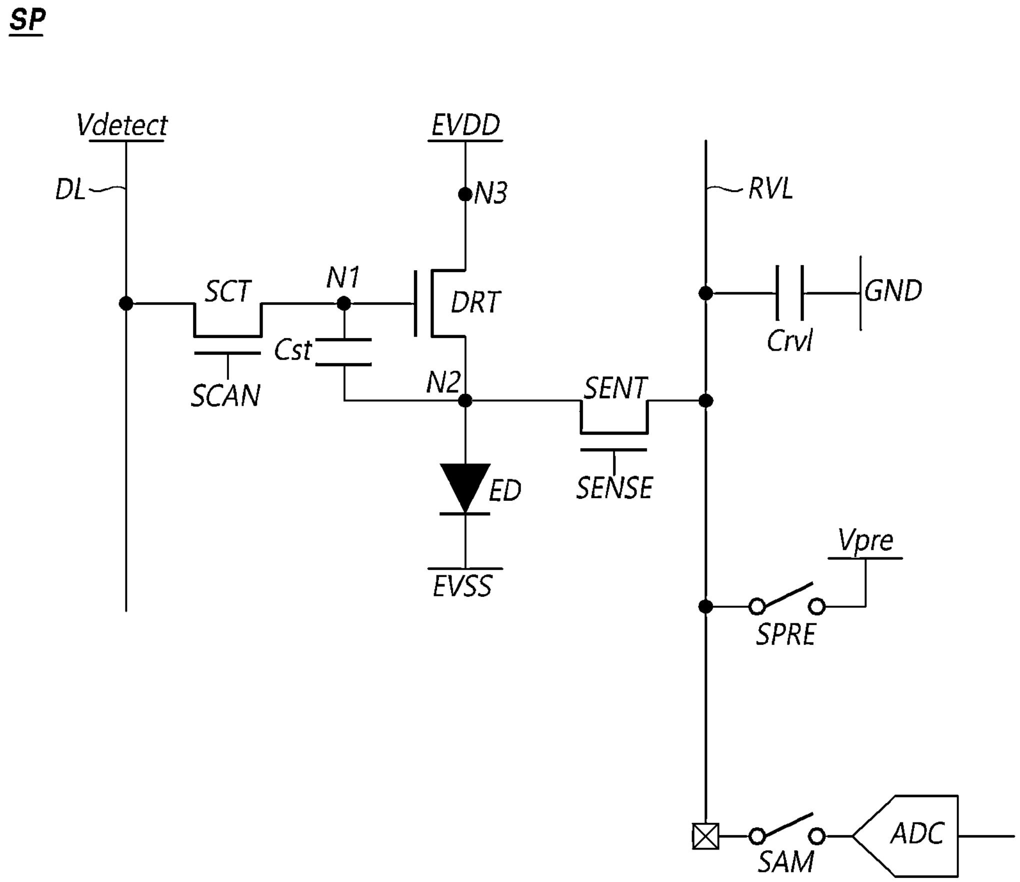
FIG. 6 is an equivalent circuit diagram of a subpixel of a display device in accordance with exemplary embodiments of the present disclosure.

FIG. 5 is a diagram illustrating a display panel 110 of a display device 100 in accordance with exemplary embodiments of the present disclosure. FIG. 6 is an equivalent circuit diagram of a subpixel SP of a display device in accordance with exemplary embodiments of the present disclosure.

Referring to FIG. 5, in the display panel 110, a plurality of gate lines GL_1 to GL_n, a plurality of reference voltage lines RVL_1 to RVL_n, a plurality of data lines (not illustrated) and a plurality of subpixels SP may be disposed. The display panel 110 illustrated in FIG. 5 may be the same as the display panel 110 illustrated in FIG. 1.

Referring to FIG. 6, a subpixel SP may include a light emitting element ED, a driving transistor DRT, a scan transistor SCT, a sensing transistor SENT and a storage capacitor Cst.

The light emitting element ED may be disposed between a base voltage EVSS and a second node N2 of the driving transistor DRT. The light emitting element ED may include a pixel electrode PE (e.g., anode), a common electrode CE (e.g., cathode), and a light emitting layer EL which is positioned between the pixel electrode PE and the common electrode CE.

A first node N1 of the driving transistor DRT may be a gate node of the driving transistor DRT, and may be electrically connected to a source node or a drain node of the scan transistor SCT. A second node N2 of the driving transistor DRT may be a source node or a drain node of the driving transistor DRT, may be electrically connected to a source node or a drain node of the sensing transistor SENT, and may also be electrically connected to the pixel electrode PE (e.g., anode) of the light emitting element ED. A third node N3 of the driving transistor DRT may be electrically connected to a driving voltage line DVL which supplies a driving voltage EVDD. Although the driving transistor DRT, scan transistor SCT and sensing transistor SENT are shown as N-MOS transistor, P-MOS transistors are applicable as well.

The scan transistor SCT may be controlled by a scan signal SCAN, and may be connected between the first node N1 of the driving transistor DRT and a data line DL.

The sensing transistor SENT may be controlled by a sense signal SENSE, and may be connected between the second node N2 of the driving transistor DRT and a reference voltage line RVL.

The scan signal SCAN and the sense signal SENSE may be supplied from the same gate line GL. For example, the scan transistor SCT and the sensing transistor SENT may be simultaneously switched to a turn-on state or a turn-off state. Alternatively, the scan signal SCAN and the sense signal SENSE may be supplied from different gate lines GL. Even in this case, the scan transistor SCT and the sensing transistor SENT may be simultaneously switched to a turned-on state or a turned-off state.

A sensing data voltage Vdetect may be supplied to the data line DL, and a precharge voltage Vpre may be supplied to the reference voltage line RVL.

The display device 100 may include a line capacitor Crvl which is formed between the reference voltage line RVL and a ground GND, a power switch SPRE which controls supply of the precharge voltage Vpre to the reference voltage line RVL, an analog-to-digital converter ADC which senses the voltage of the reference voltage line RVL, and a sampling switch SAM which controls connection between the reference voltage line RVL and the analog-to-digital converter ADC. But embodiments of the disclosure are not limited thereto, a varying number of elements may be further included herein.

A defective subpixel SPd may be detected in the circuit structure included in the above-described display device 100, and a method for driving the display device 100 will be described below in detail.

Figure 7:
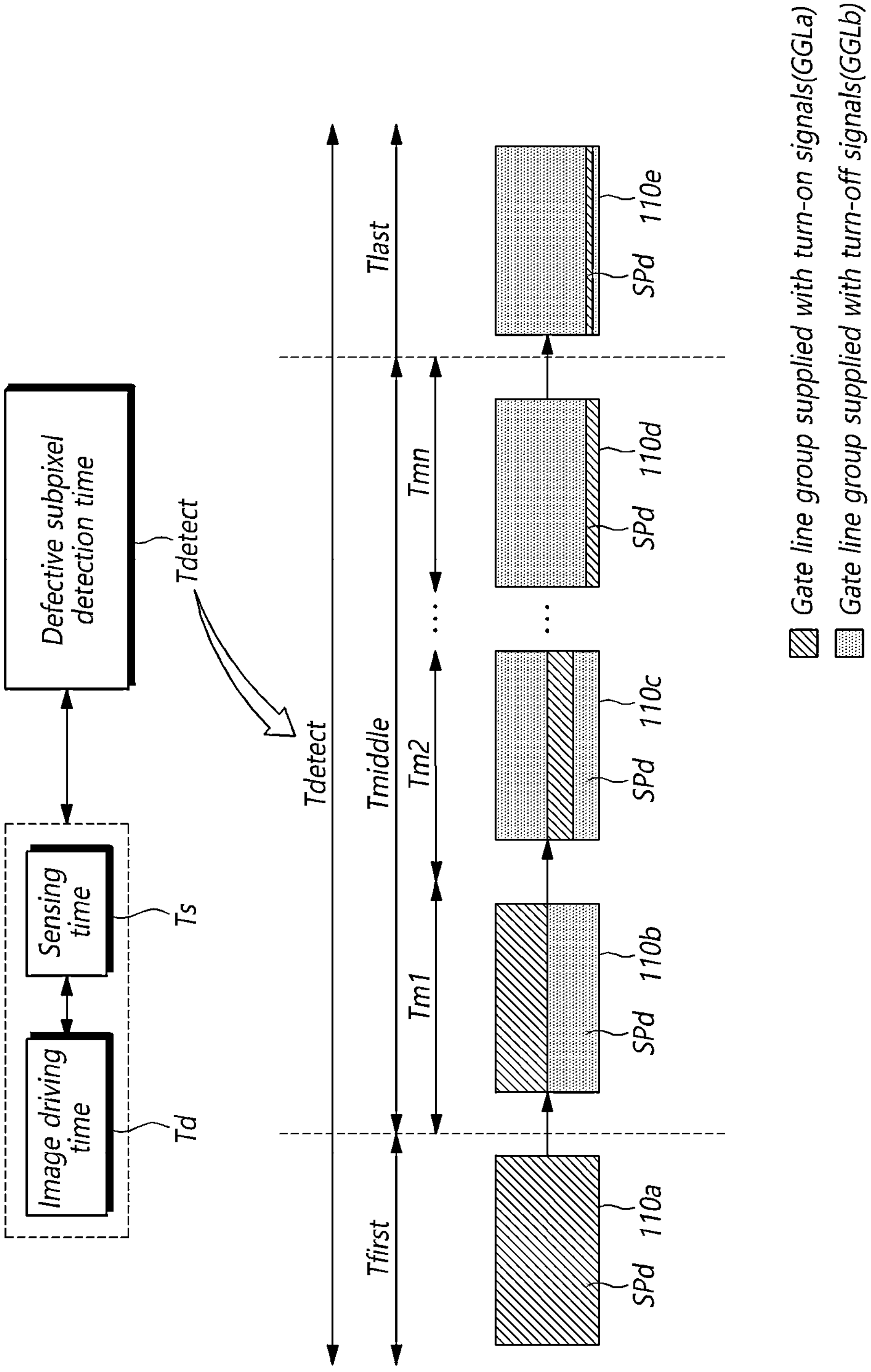
FIG. 7 is a diagram for explaining an image driving time, a characteristic value sensing time and a defective subpixel detection time in accordance with exemplary embodiments of the present disclosure.
Figure 8:
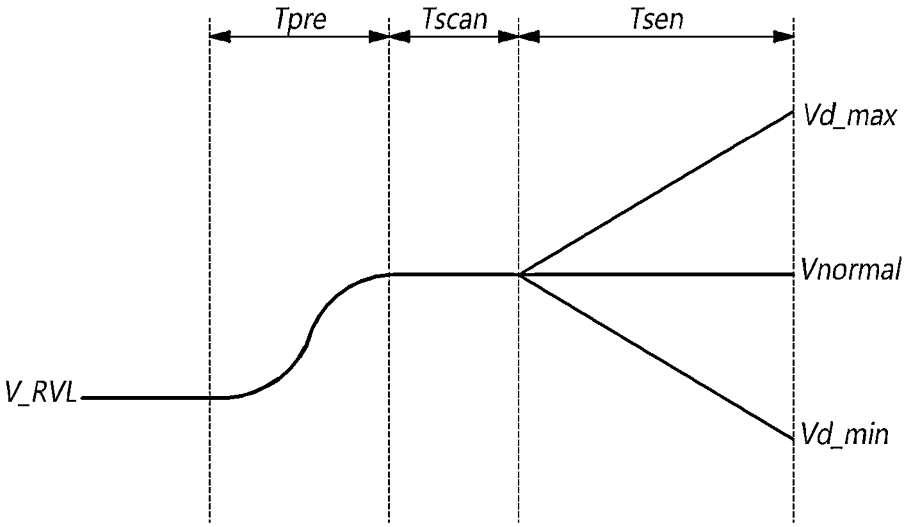
FIG. 8 shows voltages of a reference voltage line during a defective subpixel detection time in accordance with exemplary embodiments of the present disclosure.

FIG. 7 is a diagram for explaining an image driving time Td, a characteristic value sensing time Ts and a defective subpixel detection time Tdetect in accordance with exemplary embodiments of the present disclosure. FIG. 8 shows voltages of a reference voltage line during a defective subpixel detection time in accordance with exemplary embodiments of the present disclosure. FIGS. 9 to 13 are timing diagrams of signals supplied to gate lines in accordance with exemplary embodiments of the present disclosure.

Referring to FIG. 7, an image driving time Td may be a time for realizing one frame image on the display panel 110. During the image driving time Td, the gate lines GL may be turned on not simultaneously but sequentially. Thereafter, the data voltage Vdata may be supplied to the data lines DL, and accordingly, an image may be realized on the display panel 110.

A characteristic value sensing time Ts may be a time for detecting the characteristic values of the plurality of subpixels SP. The characteristic value sensing time Ts may be located between image driving times Td. Process performed in the characteristic value sensing time Ts may proceed as one sensing process among an on-sensing process, an off-sensing process and a real-time sensing process.

The on-sensing process is a sensing process in which, after a power on signal is generated in the display device 100, the characteristic value of each subpixel SP disposed in the display panel 110 is sensed.

The off-sensing process is a sensing process in which, before an off-sequence, such as a power-off, proceeds after a power off signal is generated, the characteristic value of each subpixel SP disposed in the display panel 110 is sensed.

The real-time sensing process is a sensing process in which, during a display driving from after a power-on signal is generated to before a power-off signal is generated, the characteristic value of each subpixel SP is sensed.

A defective subpixel detection time Tdetect may be a time for detecting a defective subpixel SPd among the plurality of subpixels SP. The defective subpixel SPd may for example be the same as the defective subpixels SPd illustrated in FIGS. 3 and 4. Referring to FIG. 7, the position of the defective subpixel SPd on display panels 110*a*, 110*b*, 110*c*, 110*d* and 110*e* may be checked. Although the display panels are given with the reference numerals 110*a*, 110*b*, 110*c*, 110*d* and 110*e*, all of these display panels represent the same display panel, and are given with the different reference numerals for the sake of convenience in explanation of a driving method.

The defective subpixel detection time Tdetect may be located during any one time among after a power on signal is generated in the display device 100, while the display device 100 is driven and before an off-sequence, such as a power-off, proceeds after a power off signal is generated.

Referring to FIG. 7, the defective subpixel detection time Tdetect may be located during a time different from the image driving time Td and the characteristic value sensing time Ts. The defective subpixel detection time Tdetect may be a time different from the characteristic value sensing time Ts. The characteristic value sensing time Ts may be located between image driving times Td and have a cycle, and the defective subpixel detection time Tdetect may have a cycle different from that of the characteristic value sensing time Ts. For example, after the image driving time Td starts, the characteristic value sensing time Ts may start through the real-time sensing process, and after the image driving time Td starts again, the defective subpixel detection time Tdetect may start. In other words, the defective subpixel detection time Tdetect may start while the display device 100 is driven.

The defective subpixel detection time Tdetect may start before or after the on-sensing process proceeds. After a power on signal is generated in the display device 100, the defective subpixel detection time Tdetect may start.

The defective subpixel detection time Tdetect may start before or after the off-sensing process proceeds. Before an off-sequence, such as a power-off, proceeds after a power off signal is generated, the defective subpixel detection time Tdetect may start.

Referring to FIG. 7, the defective subpixel detection time Tdetect may include a first detection time Tfirst, a plurality of middle detection times Tmiddle and a last detection time Tlast. The plurality of middle detection times Tmiddle may include a first middle detection time Tm1, a second middle detection time Tm2 and an nth middle detection time Tmn, wherein n is an integer larger than 2. The number of middle detection times Tm included in the plurality of middle detection times Tmiddle may be determined depending on the number of the plurality of gate lines GL.

The defective subpixel detection time Tdetect may continue in the order of the first detection time Tfirst, the first middle detection time Tm1, the second middle detection time Tm2 to the nth middle detection time Tmn and the last detection time Tlast. However, embodiments of the present disclosure are not limited to such examples, as long as requirement of defective subpixel detection is satisfied, the order of the first detection time Tfirst, the first middle detection time Tm1, the second middle detection time Tm2 to the nth middle detection time Tmn and the last detection time Tlast may be variously modified.

Each of the above-described times may include a scan signal supply time Tscan.

During the scan signal supply time Tscan, the plurality of gate lines GL_1 to GL_n disposed in the display panels 110*b*, 110*c*, 110*d* and 110*e* may be divided into a gate line group GGLa to which turn-on signals are supplied and a gate line group GGLb to which turn-off signals are supplied. Only the gate line group GGLa to which turn-on signals are supplied may exist in the display panel 110*a*.

Referring to FIG. 8, each detection time in the defective subpixel detection time Tdetect may include a precharging time Tpre, a scan signal supply time Tscan and a sensing time Tsen.

Each detection time in the defective subpixel detection time Tdetect may continue in the order of the precharging time Tpre, the scan signal supply time Tscan and the sensing time Tsen.

During the precharging time Tpre, the data driving circuit 120 may supply the precharge voltage Vpre to the plurality of reference voltage lines RVL, and may supply the sensing data voltage Vdetect to the plurality of data lines DL.

Referring to FIGS. 9 to 13, a turn-on signal may be applied to the power switch SPRE during the precharging time Tpre, and accordingly, the precharge voltage Vpre may be supplied to the reference voltage line RVL. Referring to FIG. 8, as the precharge voltage Vpre is supplied to the reference voltage line RVL, a voltage V_RVL of the reference voltage line RVL may rise.

After the precharging time Tpre, the scan signal supply time Tscan may start.

During the scan signal supply time Tscan, the gate driving circuit 130 may supply turn-on signals or turn-off signals to the plurality of gate lines GL. Turn-on signals supplied to the plurality of gate lines GL, respectively, may be simultaneously supplied. The turn-on signals may be high-level voltages in case that transistors as applied in present disclosure are NMOS type. However, the present disclosure is not limited thereto, for example, the turn-on signals may be low-level voltages in case that transistors as applied in present disclosure are PMOS type.

Referring to FIGS. 5 and 6, the plurality of gate lines GL may be electrically connected to gate nodes of scan transistors SCT and gate nodes of sensing transistors SENT. Since the scan transistors SCT and the sensing transistors SENT share the plurality of gate lines GL, when turn-on signals are applied to the plurality of gate lines GL, the scan transistors SCT and the sensing transistors SENT may be switched to a turn-on state.

Figure 9:
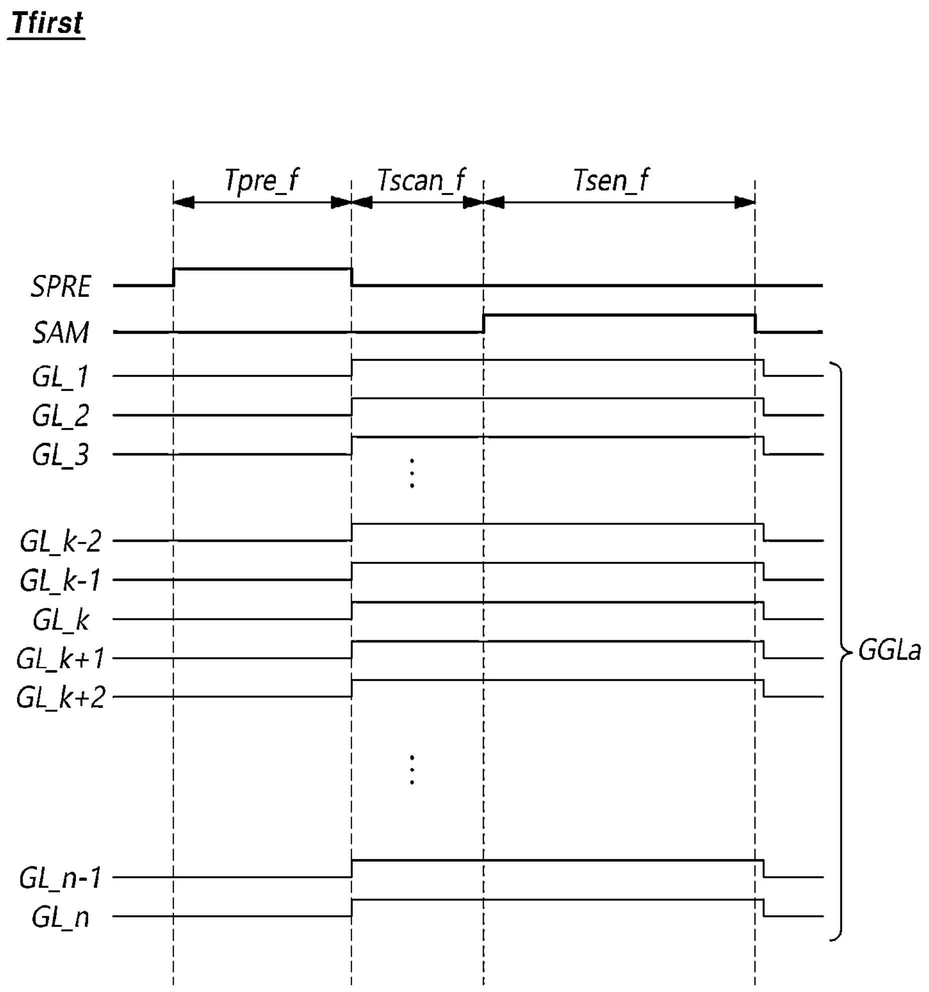
FIGS. 9 to 13 are timing diagrams of signals supplied to gate lines in accordance with exemplary embodiments of the present disclosure.

Referring to FIG. 9, only turn-on signals may be supplied in a first scan signal supply time Tscan_f included in the first detection time Tfirst. Referring to FIGS. 10 to 13, times other than the first detection time Tfirst in the defective subpixel detection time Tdetect may include scan signal supply times Tscan, and in each of the scan signal supply times Tscan, turn-on signals and turn-off signals may be simultaneously supplied.

After the scan signal supply time Tscan, the sensing time Tsen may start.

During the sensing time Tsen, the data driving circuit 120 may sense a sensing voltage Vsen which is the voltage of the reference voltage line RVL. The sensing voltage Vsen, which is the voltage of the reference voltage line RVL, may for example be sensed by the analog-to-digital converter ADC included in the data driving circuit 120. Alternatively, the sensing voltage Vsen may be sensed by another element inside or outside the data driving circuit 120.

Referring to FIGS. 9 to 13, during the sensing time Tsen, a turn-on signal may be supplied to the sampling switch SAM. Namely, the data driving circuit 120 may sense the sensing voltage Vsen, which is the voltage of the reference voltage line RVL. The analog-to-digital converter ADC may sense a voltage within a predetermined range. Within the range in which the analog-to-digital converter ADC can sense a voltage, the sensing voltage Vsen may have various voltage magnitudes.

For the sake of convenience in explanation, depending on the type of a defect of a subpixel, the sensing voltage Vsen may have three voltage values for example. In each of when the driving voltage EVDD is shorted within a defective subpixel SPd, when the base voltage EVSS is shorted within a defective subpixel SPd and when there is no defective subpixel SPd, the sensing voltage Vsen may be different.

Referring to FIG. 8, when there is no defect in a subpixel SP during the sensing time Tsen, the sensing voltage Vsen sensed by the data driving circuit 120 may be a normal range voltage Vnormal. The normal range voltage Vnormal may include a voltage of the same magnitude as the precharge voltage Vpre supplied to the reference voltage line RVL. The normal range voltage Vnormal may be a preset voltage.

Referring to FIGS. 3 and 8, when a defective subpixel SPd in which the second node N2 and the third node N3 are shorted during the sensing time Tsen is included in the display device 100, since in the sensing time Tsen, the sensing transistor SENT is turned on according to the sense signal SENSE supplied from the sense signal line SENL so as to connect the second node N2 of the driving transistor DRT to the reference voltage line RVL, the driving voltage EVDD may be transferred to the reference voltage line RVL. When sensing the reference voltage line RVL supplied with the driving voltage EVDD, the sensing voltage Vsen may be an abnormal high voltage Vd_max which is an abnormal range voltage.

The case where a defective subpixel SPd in which the second node N2 and the third node N3 are shorted during the sensing time Tsen is included in the display device 100 will be described below in detail. When a driving voltage short EVDD Short occurs in the defective subpixel SPd, the driving voltage EVDD may be supplied to the reference voltage line RVL. In this case, the voltage of the reference voltage line RVL may rise compared to when there is no defect. In order to check this, the precharge voltage Vpre smaller than the driving voltage EVDD may be supplied to the reference voltage line RVL during the precharging time Tpre. When the reference voltage line RVL is charged with the precharge voltage Vpre, the sensing voltage Vsen should be sensed as the normal range voltage Vnormal if there is no defective subpixel SPd. However, when the driving voltage short EVDD Short occurs, the driving voltage EVDD may be supplied to the reference voltage line RVL, and thus, the sensing voltage Vsen is sensed as the abnormal high voltage Vd_max.

When exemplifying the magnitude of a voltage, the driving voltage EVDD may be 24[V]. The voltage V_RVL of the reference voltage line RVL may rise to 24[V] by the driving voltage short EVDD Short. This may be sensed by the analog-to-digital converter ADC. In this case, a voltage smaller than 24[V] may be sensed because of the voltage sensing range of the analog-to-digital converter ADC. If the maximum value of the voltage sensing range of the analog-to-digital converter ADC is 4[V], the sensing voltage Vsen may be 4[V]. That is to say, the abnormal high voltage Vd_max may be 4[V]. In order to check that the abnormal high voltage Vd_max rises to 4[V], the reference voltage line RVL may be charged with the precharge voltage Vpre of 2[V] during the precharging time Tpre. In other words, when the driving voltage short EVDD Short occurs, the sensing voltage Vsen may rise from the precharge voltage Vpre of 2[V] to the abnormal high voltage Vd_max of 4[V]. Whether a defective subpixel SPd exists or not may be determined on the basis of the aforementioned phenomenon in which the sensing voltage Vsen rises. Magnitudes of the driving voltage EVDD and the precharge voltage Vpre are not limited to the values illustrated as above, and may be any values according to design requirements, as long as the precharge voltage Vpre is smaller than the driving voltage EVDD.

Referring to FIGS. 4 and 8, when a defective subpixel SPd in which the second node N2 and the supply node of the base voltage EVSS are shorted during the sensing time Tsen is included in the display device 100, the base voltage EVSS may be transferred to the reference voltage line RVL. When sensing the reference voltage line RVL supplied with the base voltage EVSS, the sensing voltage Vsen may be an abnormal low voltage Vd_min which is an abnormal range voltage.

The case where a defective subpixel SPd in which the second node N2 and the supply node of the base voltage EVSS are shorted during the sensing time Tsen is included in the display device 100 will be described below in detail. When a base voltage short EVSS Short occurs in the defective subpixel SPd, the base voltage EVSS may be supplied to the reference voltage line RVL. In this case, the voltage of the reference voltage line RVL may decrease compared to when there is no defect. In order to check this, the precharge voltage Vpre larger than the base voltage EVSS may be supplied to the reference voltage line RVL during the precharging time Tpre. When the reference voltage line RVL is charged with the precharge voltage Vpre, the sensing voltage Vsen should be sensed as the normal range voltage Vnormal if there is no defective subpixel SPd. However, when the base voltage short EVSS Short occurs, the base voltage EVSS may be supplied to the reference voltage line RVL, and thus, the sensing voltage Vsen is sensed as the abnormal low voltage Vd_min.

When exemplifying the magnitude of a voltage, the base voltage EVSS may be 0.5[V]. The voltage V_RVL of the reference voltage line RVL may decrease to 0.5[V] by the base voltage short EVSS Short. This may be sensed by the analog-to-digital converter ADC. The abnormal low voltage Vd_min may be 0.5[V]. In order to check that the abnormal low voltage Vd_min decreases to 0.5[V], the reference voltage line RVL may be charged with the precharge voltage Vpre of 2[V] during the precharging time Tpre. In other words, when the base voltage short EVSS Short occurs, the sensing voltage Vsen may decrease from the precharge voltage Vpre of 2[V] to the abnormal low voltage Vd_min of 0.5[V]. Whether a defective subpixel SPd exists or not may be determined on the basis of the aforementioned phenomenon in which the sensing voltage Vsen decreases. Magnitudes of the base voltage EVSS and the precharge voltage Vpre are not limited to the values illustrated as above, and may be any values according to design requirements, as long as the precharge voltage Vpre is larger than the base voltage EVSS.

Referring to FIG. 5, a plurality of subpixels SP may be electrically connected to one reference voltage line RVL. When a defective subpixel SPd is included among a plurality of subpixels SP which share one reference voltage line RVL, the abnormal range voltage Vd_max or Vd_min may be detected through the reference voltage line RVL.

The sensing voltage Vsen sensed by the data driving circuit 120 may be converted into sensing data, and the sensing data may be transmitted to a determination unit (not illustrated). The determination unit may be disposed inside the data driving circuit 120, or may be disposed inside the controller 140.

The determination unit may determine whether a subpixel SP is defective, on the basis of the sensing data. When the normal range voltage Vnormal is sensed during the sensing time Tsen, the determination unit may determine that there is no defective subpixel SPd in the display device 100. When the abnormal range voltage Vd_max or Vd_min is sensed during the sensing time Tsen, the determination unit may determine that there is a defective subpixel SPd in the display device 100.

When it is determined that a defective subpixel SPd exists, it may be determined that at least one defective subpixel SPd exists in a subpixel column which shares the reference voltage line RVL. In addition, it may be determined that a defective subpixel SPd exists among subpixels SP which are supplied with gate signals being turn-on signals, among the plurality of subpixels SP which share the reference voltage line RVL. Therefore, by repeating a process of determining whether a defective subpixel SPd exists, while reducing the number of subpixels SP supplied with gate signals being turn-on signals, a defective subpixel SPd may be detected in the last detection time Tlast.

Each of the first detection time Tfirst, the first middle detection time Tm1, the second middle detection time Tm2, the nth middle detection time Tmn and the last detection time Tlast may include a precharging time Tpre, a scan signal supply time Tscan and a sensing time Tsen.

Hereinafter, a driving method of the display device 100 for detecting a defective subpixel SPd will be described in detail according to a driving flow.

The first detection time Tfirst may be a time that first starts in the defective subpixel detection time Tdetect.

Referring to FIG. 9, the first detection time Tfirst may include a first precharging time Tpre_f, a first scan signal supply time Tscan_f and a first sensing time Tsen_f.

During the first precharging time Tpre_f, a turn-on signal may be applied to the power switch SPRE. Accordingly, the precharge voltage Vpre may be supplied to the reference voltage line RVL.

During the first scan signal supply time Tscan_f, turn-on signals may be supplied to the plurality of gate lines GL_1 to GL_n. The gate line group GGLa to which turn-on signals are supplied may include all of the plurality of gate lines GL_1 to GL_n. The turn-on signals may be maintained even during the first sensing time Tsen_f. Referring to FIG. 7, turn-on signals may be supplied to all the plurality of gate lines GL_1 to GL_n of the gate line group GGLa constituted by the plurality of gate lines GL_1 to GL_n which are disposed in the display panel 110*a*.

During the first sensing time Tsen_f, a turn-on signal may be supplied to the sampling switch SAM. Accordingly, the data driving circuit 120 may sense the sensing voltage Vsen, which is the voltage of the reference voltage line RVL.

When the determination unit determines that the sensing voltage Vsen is the abnormal range voltage Vd_max or Vd_min, the plurality of middle detection times Tmiddle may start. On the other hand, when the determination unit determines that the sensing voltage Vsen is the preset normal range voltage Vnormal, the defective subpixel detection time Tdetect may be ended.

The plurality of middle detection times Tmiddle may start after the first detection time Tfirst. The plurality of middle detection times Tmiddle may include the first middle detection time Tm1 to the nth middle detection time Tmn.

The number of middle detection times Tm included in the plurality of middle detection times Tmiddle may be determined depending on the number of the plurality of gate lines GL_1 to GL_n. If the number of the plurality of gate lines GL_1 to GL_n is 1024, n may be 8, and if the number of the plurality of gate lines GL_1 to GL_n is 4096, n may be 10. However, the relationship between the number N of gate lines and n may be changed according to a design change, not limited to N=2".

Figure 10:
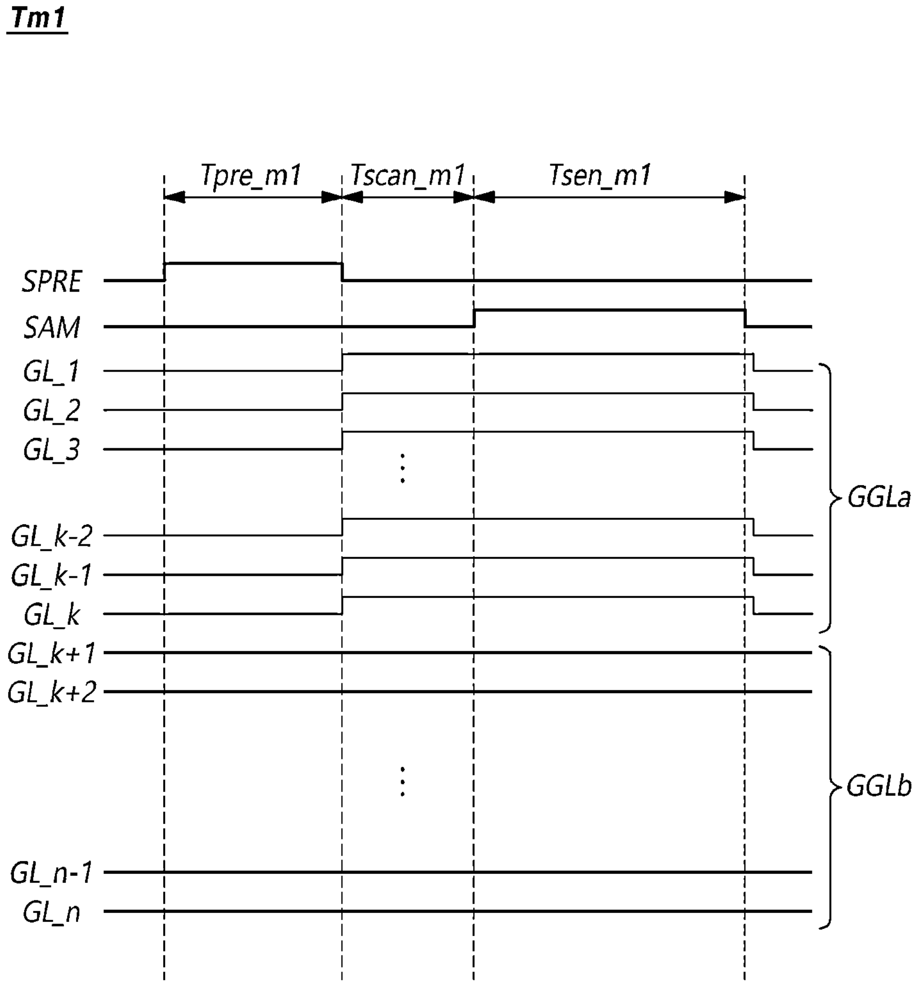

Referring to FIG. 10, the plurality of middle detection times Tmiddle may include the first middle detection time Tm1. The first middle detection time Tm1 may be a middle detection time Tm that first starts among the plurality of middle detection times Tmiddle. The first middle detection time Tm1 may include a first middle precharging time Tpre_m1, a first middle scan signal supply time Tscan_m1 and a first middle sensing time Tsen_m1.

During the first middle precharging time Tpre_m1, a turn-on signal may be applied to the power switch SPRE. Accordingly, the precharge voltage Vpre may be supplied to the reference voltage line RVL.

During the first middle scan signal supply time Tscan_m1, turn-on signals may be supplied to only half gate lines among the plurality of gate lines GL_1 to GL_n to which turn-on signals are supplied in the first scan signal supply time Tscan_f. The half gate lines may be gate lines GL corresponding to ½ of the number of the plurality of gate lines GL_1 to GL_n.

For example, referring to FIG. 10, during the first middle scan signal supply time Tscan_m1, turn-on signals and turn-off signals may be supplied to the plurality of gate lines GL_1 to GL_n. The gate line group GGLa to which turn-on signals are supplied may include a first gate line GL_1 to a kth gate line GL_k. The gate line group GGLb to which turn-off signals are supplied may include a (k+1)th gate line GL_k+1 to an nth gate line GL_n. The turn-on signals and the turn-off signals may be maintained even during the first middle sensing time Tsen_m1. Referring to FIG. 7, the gate line group GGLa to which turn-on signals are supplied and the gate line group GGLb to which turn-off signals are supplied may be checked in the display panel 110*b*. In FIG. 10, the gate line group GGLa to which turn-on signals are supplied may be a first-first gate line group (e.g., "first gate line group"), and the gate line group GGLb to which turn-off signals are supplied may be a first-second gate line group (e.g., "second gate line group").

However, the present disclosure is not limited to the above example. As another example, turn-on signals may be supplied to a first-second gate line group, and turn-off signals may be supplied to a first-first gate line group.

During the first middle sensing time Tsen_m1, a turn-on signal may be supplied to the sampling switch SAM. Accordingly, the data driving circuit 120 may sense the sensing voltage Vsen, which is the voltage of the reference voltage line RVL.

After the first middle detection time T_m1, a middle detection time Tm2 of a next stage may start, and the determination unit may determine, on the basis of sensing data, gate lines GL to which turn-on signals are to be supplied in the middle scan signal supply time Tscan_m2 of the next stage. The number of the gate lines GL may be half of the number of gate lines GL to which turn-on signals are supplied in the first middle scan signal supply time Tscan_m1 of the current stage. Gate lines GL to which turn-on signals are to be supplied may be adjacent to each other, but may not be adjacent to each other. This may be referred to as a "binary defective subpixel detection procedure." In all of sensing times Tsen_m included in the plurality of middle detection times Tmiddle, the binary defective subpixel detection procedure of the determination unit may be performed.

When the determination unit determines on the basis of sensing data that the sensing voltage Vsen is included in the abnormal range voltage Vd_max or Vd_min out of the preset normal range voltage Vnormal, during a second middle scan signal supply time Tscan_m2 included in the second middle detection time Tm2, the gate driving circuit 130 may supply turn-on signals to a second-first gate line group (e.g., "third gate line group") included in the first-first gate line group, and may supply turn-off signals to the remaining gate lines GL other than the second-first gate line group among the plurality of gate lines GL_1 to GL_n. In other words, when the sensing voltage Vsen is included in the abnormal range voltage Vd_max or Vd_min, during the second middle scan signal supply time Tscan_m2, turn-on signals may be supplied to only half gate lines in the first-first gate line group.

Figure 11:
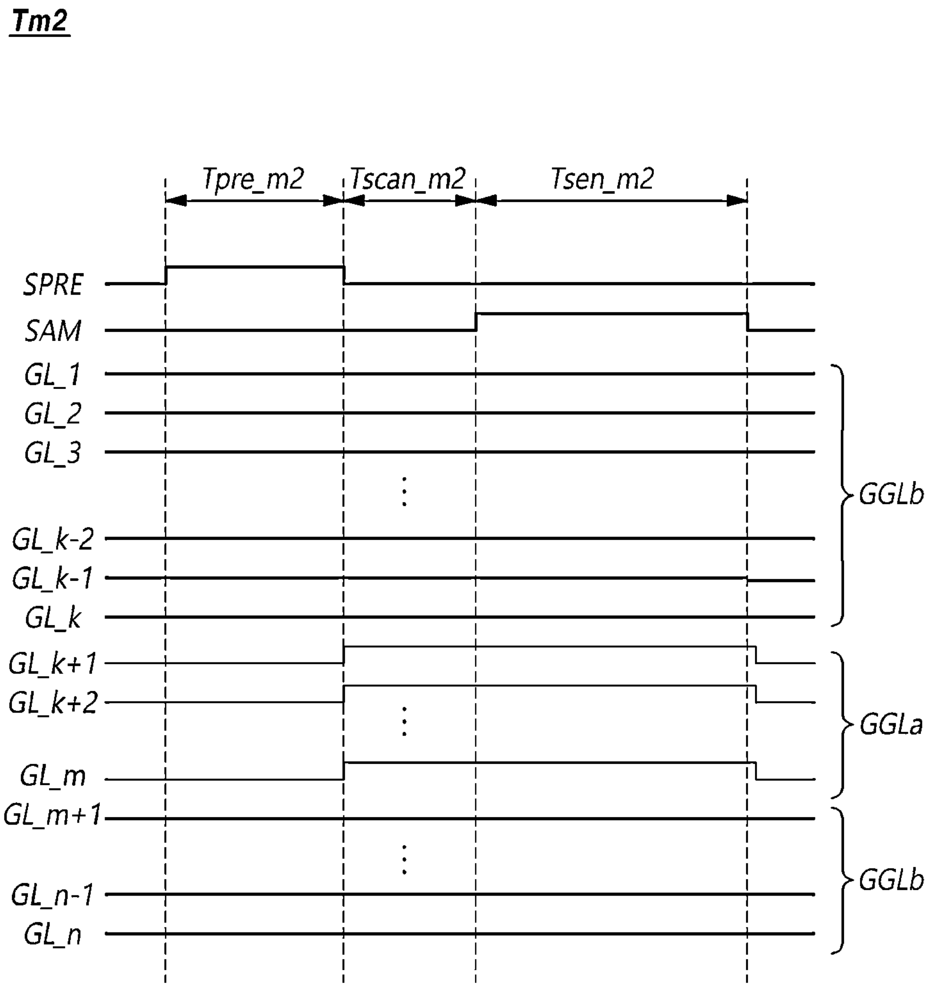

On the other hand, when the determination unit determines on the basis of sensing data that the sensing voltage Vsen is included in the normal range voltage Vnormal, during the second middle scan signal supply time Tscan_m2 included in the second middle detection time Tm2, the gate driving circuit 130 may supply turn-on signals to a second-second gate line group (e.g., "fourth gate line group") included in the first-second gate line group, and may supply turn-off signals to the remaining gate lines GL other than the second-second gate line group among the plurality of gate lines GL_1 to GL_n. The second-second gate line group may be the gate line group GGLa constituted by gate lines GL_k+1 to GL_m to which turn-on signals are supplied as illustrated in FIG. 11, and the remaining gate lines GL other than the second-second gate line group among the plurality of gate lines GL_1 to GL_n may be the gate line group GGLb constituted by gate lines GL_1 to GL_k and GL_m+1 to GL_n to which turn-off signals are supplied as illustrated in FIG. 11. Namely, when the sensing voltage Vsen is included in the normal range voltage Vnormal, during the second middle scan signal supply time Tscan_m2, turn-on signals may be supplied to only half gate lines in the first-second gate line group.

Referring to FIG. 11, the plurality of middle detection times Tmiddle may include the second middle detection time Tm2. The second middle detection time Tm2 may be a middle detection time Tm that starts next to the first middle detection time Tm1. The second middle detection time Tm2 may include a second middle precharging time Tpre_m2, a second middle scan signal supply time Tscan_m2 and a second middle sensing time Tsen_m2.

During the second middle precharging time Tpre_m2, a turn-on signal may be applied to the power switch SPRE. Accordingly, the precharge voltage Vpre may be supplied to the reference voltage line RVL.

During the second middle scan signal supply time Tscan_m2, turn-on signals may be supplied to only half gate lines of the gate lines of the gate line group GGLa to which turn-on signals are supplied in the first middle scan signal supply time Tscan_m1. The half gate lines may be gate lines GL corresponding to ¼ of the number of the plurality of gate lines GL_1 to GL_n.

For example, referring to FIG. 11, during the second middle scan signal supply time Tscan_m2, turn-on signals and turn-off signals may be supplied to the plurality of gate lines GL_1 to GL_n. The gate line group GGLa to which turn-on signals are supplied may include the (k+1)th gate line GL_k+1 to an mth gate line GL_m. The gate line group GGLb to which turn-off signals are supplied may include the first gate line GL_1 to the kth gate line GL_k and an (m+1)th gate line GL_m+1 to the nth gate line GL_n. The turn-on signals and the turn-off signals may be maintained even during the second middle sensing time Tsen_m2. Referring to FIG. 7, the gate line group GGLa to which turn-on signals are supplied and the gate line group GGLb to which turn-off signals are supplied may be checked in the display panel 110*c*. In FIG. 11, the gate line group GGLa to which turn-on signals are supplied may be the second-second gate line group.

As an example different from the above example, when turn-on signals are supplied to the first gate lines GL_1 to the kth gate line GL_k during the first middle scan signal supply time Tscan_m1 and the determination unit determines on the basis of sensing data that the sensing voltage Vsen is included in the abnormal range voltage Vd_max or Vd_min out of the preset normal range voltage Vnormal during the first middle sense time Tsen_m1, a group including half gate lines among the first gate line GL_1 to the kth gate line GL_k illustrated in FIG. 11 may be the second-first gate line group. In this case, turn-on signals may be supplied to the second-first gate line group, and turn-off signals may be supplied to all the gate lines other than the second-first gate line group.

During the second middle sensing time Tsen_m2, a turn-on signal may be supplied to the sampling switch SAM. Accordingly, the data driving circuit 120 may sense the sensing voltage Vsen, which is the voltage of the reference voltage line RVL.

The binary defective subpixel detection procedure performed by the determination unit in the first middle sensing time Tsen_m1 may be performed even in the second middle sensing time Tsen_m2. That is to say, since turn-on signals are supplied to gate lines GL corresponding to ¼ of the number of the plurality of gate lines GL_1 to GL_n during the second middle scan signal supply time Tscan_m2, the determination unit may perform the binary defective subpixel detection procedure during a middle scan signal supply time Tscan_m3 of a subsequent stage so that turn-on signals may be supplied to gate lines GL corresponding to ⅛ of the number of the plurality of gate lines GL_1 to GL_n.

The plurality of middle detection times Tmiddle include a third middle detection time Tm3 to an (n−1)th middle detection time Tmn−1. The characteristics of the third middle detection time Tm3 to the (n−1)th middle detection time Tmn−1 are the same as those of the second middle detection time Tm2. In the third middle detection time Tm3, turn-on signals may be supplied to gate lines GL corresponding to ⅛ of the number of the plurality of gate lines GL_1 to GL_n. In a fourth middle detection time Tm4, turn-on signals may be supplied to gate lines GL corresponding to 1/16 of the number of the plurality of gate lines GL_1 to GL_n. Thereafter, in the (n−1)th middle detection time Tmn−1, turn-on signals may be supplied to gate lines GL $$\frac{1}{2^{n-1}}$$

corresponding to of the number of the plurality of gate lines GL_1 to GL_n. In other words, since the characteristics of the third middle detection time Tm3 to the (n−1)th middle detection time Tmn−1 are the same as those of the second middle detection time Tm2, repetitive description thereof will be omitted.

Figure 12:
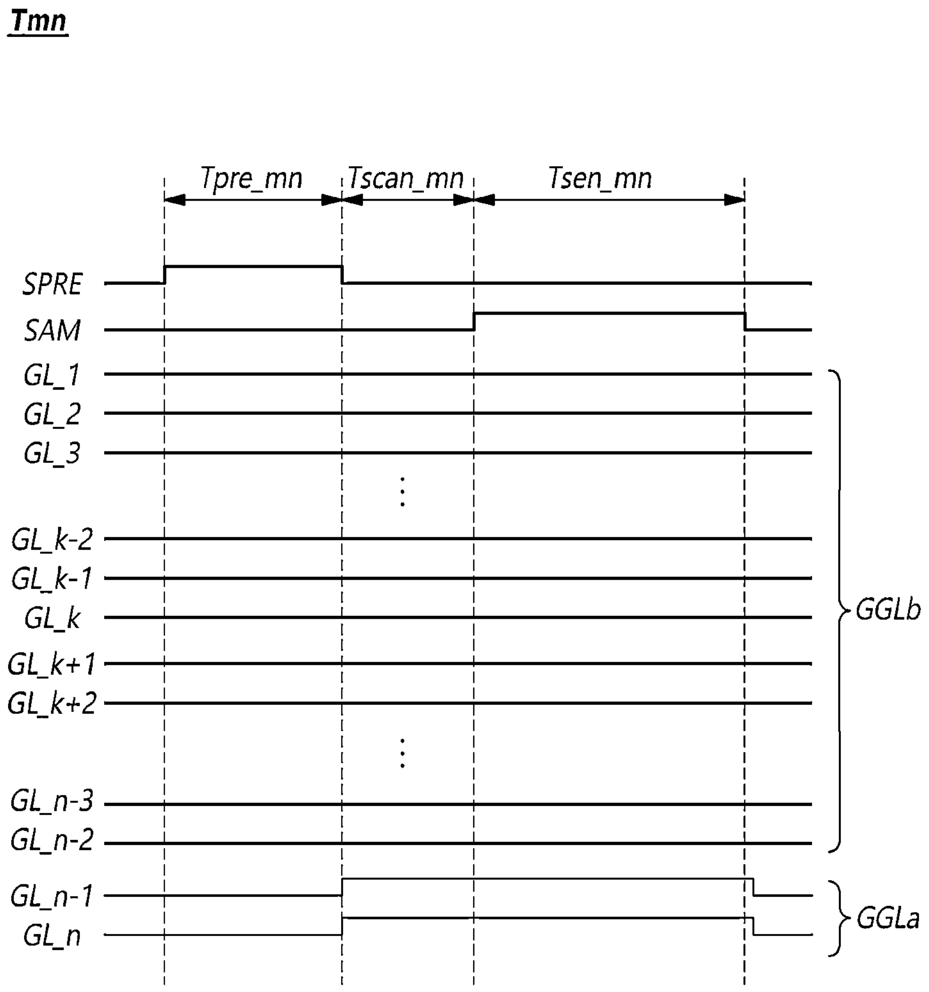

Referring to FIG. 12, the plurality of middle detection times Tmiddle may include the nth middle detection time Tmn. The nth middle detection time Tmn may be a last middle detection time Tm among the plurality of middle detection times Tmiddle. The nth middle detection time Tmn may include an nth middle precharging time Tpre_mn, an nth middle scan signal supply time Tscan_mn and an nth middle sensing time Tsen_mn.

During the nth middle precharging time Tpre_mn, a turn-on signal may be applied to the power switch SPRE. Accordingly, the precharge voltage Vpre may be supplied to the reference voltage line RVL.

During the nth middle scan signal supply time Tscan_mn, turn-on signals may be supplied to two gate lines GL included in the plurality of gate lines GL_1 to GL_n, and turn-off signals may be supplied to the remaining gate lines GL.

For example, referring to FIG. 12, during the nth middle scan signal supply time Tscan_mn, turn-on signals and turn-off signals may be supplied to the plurality of gate lines GL_1 to GL_n. The gate line group GGLa to which turn-on signals are supplied may include an (n−1)th gate line GL_n−1 and the nth gate line GL_n. The gate line group GGLb to which turn-off signals are supplied may include the first gate line GL_1 to an (n−2)th gate line GL_n−2. The turn-on signals and the turn-off signals may be maintained even during the nth middle sensing time Tsen_mn. Referring to FIG. 7, the gate line group GGLa to which turn-on signals are supplied and the gate line group GGLb to which turn-off signals are supplied may be checked in the display panel 110*d*.

During the nth middle sensing time Tsen_mn, a turn-on signal may be supplied to the sampling switch SAM. Accordingly, the data driving circuit 120 may sense the sensing voltage Vsen, which is the voltage of the reference voltage line RVL.

When the determination unit determines on the basis of sensing data that the sensing voltage Vsen is included in the abnormal range voltage Vd_max or Vd_min, during a last scan signal supply time Tscan_m1, a turn-on signal may be supplied to any one gate line of the (n−1)th gate line GL_n−1 and the nth gate line GL_n.

When the determination unit determines on the basis of sensing data that the sensing voltage Vsen is included in the normal range voltage Vnormal, during a last scan signal supply time Tscan_1, a turn-on signal may be supplied to any one gate line of an (n−3)th gate line GL_n−3 and the (n−2)th gate line GL_n−2.

After the plurality of middle detection times Tmiddle, the last detection time Tlast may start.

Figure 13:
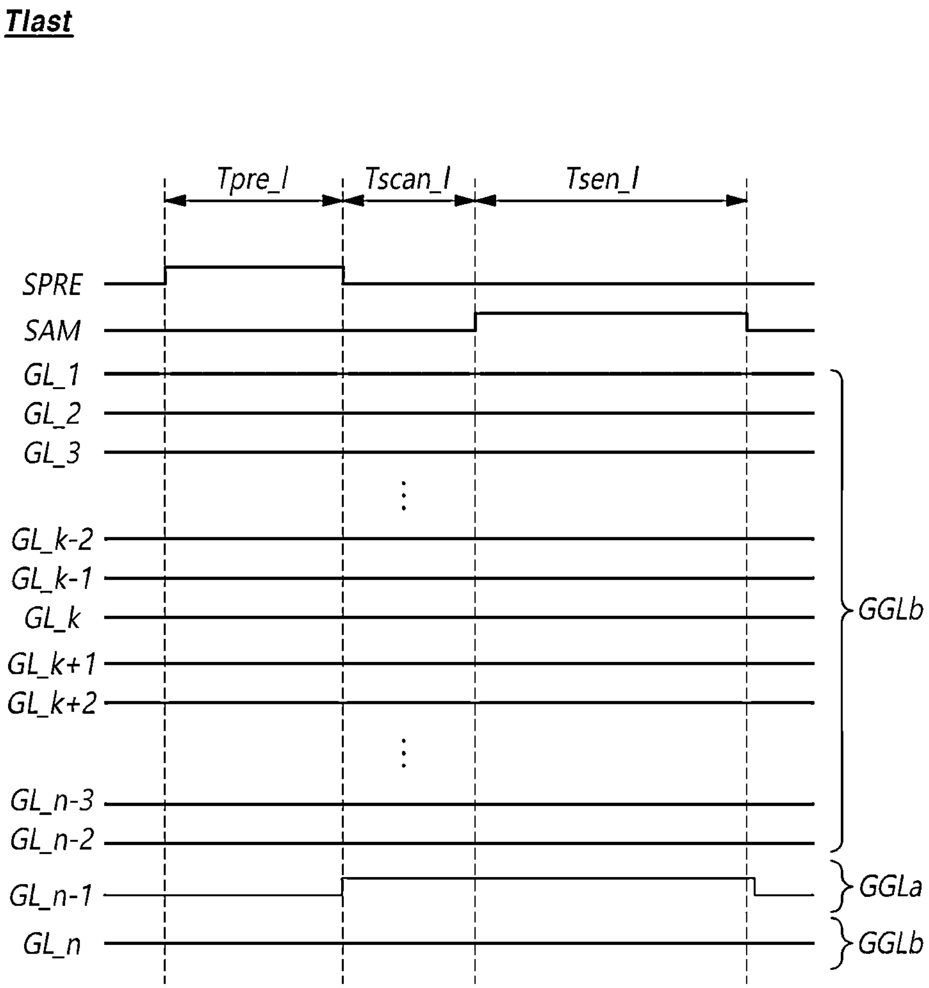

Referring to FIG. 13, the last detection time Tlast may include a last precharging time Tpre_1, a last scan signal supply time Tscan_1 and a last sensing time Tsen_1.

During the last precharging time Tpre_1, a turn-on signal may be applied to the power switch SPRE. Accordingly, the precharge voltage Vpre may be supplied to the reference voltage line RVL.

During the last scan signal supply time Tscan_1, a turn-on signal may be supplied to one gate line GL included in the plurality of gate lines GL_1 to GL_n, and turn-off signals may be supplied to the remaining gate lines GL.

For example, during the last scan signal supply time Tscan_1, a turn-on signal and turn-off signals may be supplied to the plurality of gate lines GL_1 to GL_n. The gate line group GGLa to which a turn-on signal is supplied may include the (n−1)th gate line GL_n−1. The gate line group GGLb to which turn-off signals are supplied may include the first gate line GL_1 to the (n−2)th gate line GL_n−2 and the nth gate line GL_n. The turn-on signal and the turn-off signals may be maintained even during the last sensing time Tsen_1. Referring to FIG. 7, the gate line group GGLa to which a turn-on signal is supplied and the gate line group GGLb to which turn-off signals are supplied may be checked in the display panel 110*e*. Although the gate line group GGLa to which a turn-on signal is supplied is referred to as a group, only the (n−1)th gate line GL_n−1 as one gate line may be included in the gate line group GGLa.

During the last sensing time Tsen_1, a turn-on signal may be supplied to the sampling switch SAM. Accordingly, the data driving circuit 120 may sense the sensing voltage Vsen, which is the voltage of the reference voltage line RVL.

Some subpixels SP sharing the gate line GL_n−1 to which a turn-on signal is supplied may include defective subpixels SPd. Reference voltage lines RVL are electrically connected to some subpixels SP, respectively, and the data driving circuit 120 may sense the sensing voltage Vsen through each reference voltage line RVL. Since it is the last detection time Tlast, a turn-on signal may be supplied to only one gate line GL. Therefore, when the sensing voltage Vsen is the abnormal range voltage Vd_max or Vd_min, it may be determined that a subpixel SP connected to a corresponding reference voltage line RVL is a defective subpixel SPd. That is to say, a defective subpixel SPd may be detected.

Some subpixels SP sharing the gate line GL_n−1 to which a turn-on signal is supplied may not include a defective subpixel SPd. Reference voltage lines RVL are electrically connected to some subpixels SP, respectively, and the data driving circuit 120 may sense the sensing voltage Vsen through each reference voltage line RVL. Since it is the last detection time Tlast, a turn-on signal may be supplied to only one gate line GL. Therefore, when the sensing voltage Vsen is the normal range voltage Vnormal, it may be determined that a defective subpixel SPd exists among subpixels SP connected to the nth gate line GL_n illustrated in FIG. 12. Thereafter, by repeating the above-described defective subpixel detection process through supplying a turn-on signal to the nth gate line GL_n, a defective subpixel SPd may be detected.

In other words, in accordance with the embodiments of the present disclosure, since the "binary defective subpixel detection procedure" may be performed during the aforementioned defective subpixel detection time Tdetect, it is possible to quickly detect a defective subpixel SPd.

According to the embodiments of the present disclosure described above, it is possible to provide a display device and a driving method thereof, capable of quickly detecting a defective subpixel.

A brief description of the embodiments of the present disclosure described above is as follows.

According to embodiments of the present disclosure, it is possible to provide a display device 100 including: a display panel 110 including a plurality of subpixels SP which are electrically connected to a plurality of data lines DL, a plurality of reference voltage lines RVL and a plurality of gate lines GL, a data driving circuit 120 configured to supply voltages to the plurality of data lines DL and sense voltages of the plurality of reference voltage lines RVL, and a gate driving circuit 130 configured to supply gate signals to the plurality of gate lines GL, wherein a defective subpixel detection time Tdetect for detecting a defective subpixel SPd among the plurality of subpixels SP includes a first middle scan signal supply time Tscan_m1 in which the gate driving circuit 130 supplies turn-on signals to a first-first gate line group included in the plurality of gate lines GL and supplies turn-off signals to a first-second gate line group other than the first-first gate line group among the plurality of gate lines GL.

The display device 100 may include an image driving time Td for expressing an image on the display panel 110 and a characteristic value sensing time Ts for detecting characteristic values of the plurality of subpixels SP.

The defective subpixel detection time Tdetect may be located during a time different from the image driving time Td and the characteristic value sensing time Ts.

In the first middle scan signal supply time, the turn-on signals may be simultaneously supplied to all the gate lines which are included in the first-first gate line group.

A plurality of middle detection times Tmiddle included in the defective subpixel detection time Tdetect may include a first middle detection time Tm1, a second middle detection time Tm2 through an nth middle detection time Tmn, wherein n is an integer larger than 2, and the first middle detection time Tm1 may include the first middle scan signal supply time Tscan_m1.

The number of middle detection times Tm included in the plurality of middle detection times Tmiddle may be determined depending on the number of the plurality of gate lines GL.

The first middle detection time Tm1 may include a first middle precharging time Tpre_m1 that is located before the first middle scan signal supply time Tscan_m1, and in the first middle precharging time Tpre_m1, the data driving circuit 120 may supply a sensing data voltage Vdetect to the plurality of data lines DL and supply a precharge voltage Vpre to the plurality of reference voltage lines RVL.

The first middle detection time Tm1 may include a first middle sensing time Tsen_m1 that is located after the first middle scan signal supply time Tscan_m1; in the first middle sensing time Tsen_m1, the data driving circuit 120 may sense a sensing voltage Vsen, which is a voltage of the reference voltage line RVL; when the sensing voltage Vsen is included in an abnormal range voltage Vd_max or Vd_min out of a preset normal range voltage Vnormal, in a second middle scan signal supply time Tscan_m2 included in the second middle detection time Tm2, turn-on signals may be supplied to a second-first gate line group which is included in the first-first gate line group and turn-off signals may be supplied to remaining gate lines other than the second-first gate line group among the plurality of gate lines GL; and when the sensing voltage Vsen is included in the normal range voltage Vnormal, in the second middle scan signal supply time Tscan_m2 included in the second middle detection time Tm2, turn-on signals may be supplied to a second-second gate line group which is included in the first-second gate line group and turn-off signals may be supplied to remaining gate lines other than the second-second gate line group among the plurality of gate lines GL.

The nth middle detection time Tmn may include an nth middle scan signal supply time Tscan_mn in which the gate driving circuit 130 supplies turn-on signals to two gate lines included in the plurality of gate lines GL and supplies turn-off signals to remaining gate lines other than the two gate lines among the plurality of gate lines GL.

The defective subpixel detection time Tdetect may include a first detection time Tfirst as an initial detection time that is located before the plurality of middle detection times Tmiddle; the first detection time Tfirst may include a first precharging time Tpre_f, a first scan signal supply time Tscan_f and a first sensing time Tsen_f; in the first precharging time Tpre_f, the data driving circuit 120 may supply a sensing data voltage Vdetect to the plurality of data lines DL and supply a precharge voltage Vpre to the plurality of reference voltage lines RVL; and in the first scan signal supply time Tscan_f, the gate driving circuit 130 may supply turn-on signals to the plurality of gate lines GL.

In the first sensing time Tsen_f, the data driving circuit 120 may sense a sensing voltage Vsen, which is a voltage of the reference voltage line RVL; when the sensing voltage Vsen is included in an abnormal range voltage Vd_max or Vd_min out of a preset normal range voltage Vnormal, the plurality of middle detection times Tmiddle may start; and when the sensing voltage Vsen is included in the normal range voltage Vnormal, the defective subpixel detection time Tdetect may be ended.

The defective subpixel detection time Tdetect may include a last detection time Tlast that is located after the plurality of middle detection times Tmiddle, and the last detection time Tlast may include a last precharging time Tpre_1, a last scan signal supply time Tscan_1 and a last sensing time Tsen_1.

In the last scan signal supply time Tscan_1 that is located after the last precharging time Tpre_1, the gate driving circuit 130 may supply a turn-on signal to one gate line included in the plurality of gate lines GL and may supply turn-off signals to remaining gate lines other than the one gate line among the plurality of gate lines GL.

In the last sensing time Tsen_1 that is located after the last scan signal supply time Tscan_1, the data driving circuit 120 may sense a sensing voltage Vsen, which is a voltage of the reference voltage line RVL, and the defective subpixel SPd may be detected by the sensing voltage.

Each of the plurality of subpixels SP may include a driving transistor DRT for driving a light emitting element ED, and the defective subpixel SPd may indicate that the light emitting element ED is defective or the driving transistor DRT is defective.

The data driving circuit 120 may include an analog-to-digital converter ADC which is electrically connected to the plurality of reference voltage lines RVL.

According to embodiments of the present disclosure, it is possible to provide a method for driving a display device 100, including a first detection time Tfirst as an initial detection time for detecting a defective subpixel SPd among a plurality of subpixels SP, a plurality of middle detection times Tmiddle that are located after the first detection time Tfirst, and a last detection time Tlast that is located after the plurality of middle detection times Tmiddle and in which the defective subpixel SPd is detected, wherein the plurality of middle detection times Tmiddle include a first middle scan signal supply time Tscan_m1 in which a gate driving circuit 130 supplies turn-on signals to a first-first gate line group included in a plurality of gate lines GL and supplies turn-off signals to a first-second gate line group other than the first-first gate line group among the plurality of gate lines GL.

The turn-on signals may be simultaneously supplied to gate lines which are included in the first-first gate line group.

The plurality of middle detection times Tmiddle may include a first middle detection time Tm1 and a second middle detection time Tm2 that is located after the first middle detection time Tm1, the first middle detection time Tm1 may include a first middle scan signal supply time Tscan_m1 and a first middle precharging time Tpre_m1 that is located before the first middle scan signal supply time Tscan_m1, and, in the first middle precharging time Tpre_m1, a data driving circuit 120 may supply a sensing data voltage Vdetect to a plurality of data lines DL and supply a precharge voltage Vpre to a plurality of reference voltage lines RVL.

The first middle detection time Tm1 may include a first middle sensing time Tsen_m1 that is located after the first middle scan signal supply time Tscan_m1; in the first middle sensing time Tsen_m1, the data driving circuit 120 may sense a sensing voltage Vsen, which is a voltage of the reference voltage line RVL; when the sensing voltage Vsen is included in an abnormal range voltage Vd_max or Vd_min out of a preset normal range voltage Vnormal, in a second middle scan signal supply time Tscan_m2 included in the second middle detection time Tm2, turn-on signals may be supplied to a second-first gate line group which is included in the first-first gate line group and turn-off signals may be supplied to remaining gate lines other than the second-first gate line group among the plurality of gate lines GL; and when the sensing voltage Vsen is included in the normal range voltage Vnormal, in the second middle scan signal supply time Tscan_m2 included in the second middle detection time Tm2, turn-on signals may be supplied to a second-second gate line group which is included in the first-second gate line group and turn-off signals may be supplied to remaining gate lines other than the second-second gate line group among the plurality of gate lines GL.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

What is claimed is:

1. A display device comprising:

a display panel including a plurality of subpixels which are electrically connected to a plurality of data lines, a plurality of reference voltage lines, and a plurality of gate lines;

a data driving circuit configured to supply voltages to the plurality of data lines and sense voltages of the plurality of reference voltage lines; and a gate driving circuit configured to supply gate signals to the plurality of gate lines, wherein a defective subpixel detection time during which a defective subpixel among the plurality of subpixels is detected includes a first middle scan signal supply time, and during the first middle scan signal supply time, the gate driving circuit supplies turn-on signals to a first gate line group included in the plurality of gate lines and the gate driving circuit supplies turn-off signals to a second gate line group other than a first-first gate line group among the plurality of gate lines.

2. The display device of claim 1, wherein the display device includes an image driving time during which an image is expressed on the display panel and a characteristic value sensing time during which characteristic values of the plurality of subpixels are detected.

3. The display device of claim 2, wherein the defective subpixel detection time occurs during a time that is different from the image driving time and the characteristic value sensing time.

4. The display device of claim 2, wherein the characteristic value sensing time occurs between a plurality of image driving times and has a cycle.

5. The display device of claim 4, wherein the characteristic value sensing time has a different cycle from the defective subpixel detection time.

6. The display device of claim 4, wherein after the image driving time starts, the characteristic value sensing time starts, and after the image driving time starts again, the defective subpixel detection time starts.

7. The display device of claim 1, wherein each of the plurality of reference voltage lines is connected to a plurality of subpixels.

8. The display device of claim 1, wherein a number of the plurality of gate lines of the first gate line group is half of a number of the plurality of gate lines.

9. The display device of claim 1, wherein during the first middle scan signal supply time, the turn-on signals are simultaneously supplied to gate lines which are included in the first gate line group.

10. The display device of claim 1, wherein a plurality of middle detection times included in the defective subpixel detection time include a first middle detection time, a second middle detection time through an nth middle detection time, wherein n is an integer larger than 2, and the first middle detection time includes the first middle scan signal supply time.

11. The display device of claim 10, wherein a number of middle detection times included in the plurality of middle detection times is determined depending on a number of the plurality of gate lines.

12. The display device of claim 10, wherein the first middle detection time includes a first middle precharging time that occurs before the first middle scan signal supply time, and during the first middle precharging time, the data driving circuit supplies a sensing data voltage to the plurality of data lines, and the data driving circuit supplies a pre-charge voltage to the plurality of reference voltage lines.

13. The display device of claim 10, wherein the first middle detection time includes a first middle sensing time that occurs after the first middle scan signal supply time, during the first middle sensing time, the data driving circuit senses a sensing voltage, which is a voltage of a reference voltage line from the plurality of reference voltage lines, responsive to the sensing voltage being in an abnormal range voltage out of a preset normal range voltage during a second middle scan signal supply time included in the second middle detection time, turn-on signals are supplied to a third gate line group which is included in the first gate line group and turn-off signals are supplied to remaining gate lines other than the third gate line group among the plurality of gate lines, and responsive to the sensing voltage being in the preset normal range voltage during the second middle scan signal supply time included in the second middle detection time, turn-on signals are supplied to a fourth gate line group which is included in the second gate line group and turn-off signals are supplied to remaining gate lines other than the fourth gate line group among the plurality of gate lines.

14. The display device of claim 13, wherein a number of gate lines in the third gate line group is half of a number of gate lines in the first gate line group, and a number of gate lines in the fourth gate line group is half of a number of gate lines in the second gate line group.

15. The display device of claim 10, wherein the nth middle detection time includes an nth middle scan signal supply time in which the gate driving circuit supplies turn-on signals to two gate lines included in the plurality of gate lines and supplies turn-off signals to remaining gate lines other than the two gate lines among the plurality of gate lines.

16. The display device of claim 10, wherein the defective subpixel detection time includes a first detection time as an initial detection time that occurs before the plurality of middle detection times, the first detection time includes a first precharging time, a first scan signal supply time and a first sensing time, during the first precharging time, the data driving circuit supplies a sensing data voltage to the plurality of data lines and supplies a precharge voltage to the plurality of reference voltage lines, and during the first scan signal supply time, the gate driving circuit supplies turn-on signals to the plurality of gate lines.

17. The display device of claim 16, wherein during the first sensing time, the data driving circuit senses a sensing voltage, which is a voltage of a reference voltage line from the plurality of reference voltage lines, responsive to the sensing voltage being in an abnormal range voltage out of a preset normal range voltage, the plurality of middle detection times start, and responsive to the sensing voltage being in the preset normal range voltage, the defective subpixel detection time ends.

18. The display device of claim 17, wherein the precharge voltage is included in the preset normal range voltage.

19. The display device of claim 10, wherein the defective subpixel detection time includes a last detection time that occurs after the plurality of middle detection times, and the last detection time includes a last precharging time, a last scan signal supply time and a last sensing time, wherein during the last scan signal supply time that occurs after the last precharging time, the gate driving circuit supplies a turn-on signal to one gate line included in the plurality of gate lines, and the gate driving circuit supplies turn-off signals to remaining gate lines other than the one gate line among the plurality of gate lines.

20. A method for driving a display device, comprising:

performing a first detection time as an initial detection time for detecting a defective subpixel among a plurality of subpixels;

performing a plurality of middle detection times that occur after the first detection time; and performing a last detection time that occurs after the plurality of middle detection times and in which the defective subpixel is detected, wherein the plurality of middle detection times include a first middle scan signal supply time, and during the first middle scan signal supply time, a gate driving circuit supplies turn-on signals to a first gate line group included in a plurality of gate lines, and the gate driving circuit supplies turn-off signals to a second gate line group other than the first gate line group among the plurality of gate lines.

* * * * *